United States Patent
Kondapuram et al.

(10) Patent No.: US 12,451,399 B2
(45) Date of Patent: Oct. 21, 2025

(54) INTEGRATED THERMAL SOLUTION TO ENABLE OPERATION OF EMBEDDED PROCESSORS IN SUB-ZERO TEMPERATURES

(71) Applicant: Intel Corporation, Santa Clara, CA (US)

(72) Inventors: Ganesh Kondapuram, Chandler, AZ (US); Chetan Rawal, Chandler, AZ (US); Kevin Connolly, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 737 days.

(21) Appl. No.: 17/673,487

(22) Filed: Feb. 16, 2022

(65) Prior Publication Data

US 2023/0260864 A1    Aug. 17, 2023

(51) Int. Cl.
| | |
|---|---|
| *H01L 23/34* | (2006.01) |
| *G05D 23/19* | (2006.01) |
| *G06F 9/4401* | (2018.01) |
| *H01L 25/18* | (2023.01) |
| *H05B 3/14* | (2006.01) |
| *H10D 84/01* | (2025.01) |
| *H10D 84/03* | (2025.01) |
| *H10D 84/80* | (2025.01) |
| *H10D 89/10* | (2025.01) |

(52) U.S. Cl.
CPC ....... *H01L 23/345* (2013.01); *G05D 23/1917* (2013.01); *G06F 9/4403* (2013.01); *H01L 25/18* (2013.01); *H05B 3/148* (2013.01); *H10D 84/013* (2025.01); *H10D 84/038* (2025.01); *H10D 84/811* (2025.01); *H10D 89/105* (2025.01)

(58) Field of Classification Search
CPC ..... H01L 23/345; H01L 25/18; H10D 89/105; H10D 84/013; H10D 84/811; H10D 84/038; G05D 23/1917; G06F 9/4403; H05B 3/148
See application file for complete search history.

(56) References Cited

U.S. PATENT DOCUMENTS

| | | | | |
|---|---|---|---|---|
| 7,338,637 | B2 * | 3/2008 | Pease | B01L 3/5027 422/50 |
| 8,212,184 | B2 * | 7/2012 | Mowry | H01L 23/345 219/209 |
| 9,165,853 | B2 * | 10/2015 | Wang | H05B 3/0014 |
| 10,338,623 | B2 * | 7/2019 | De Natale | H02H 5/047 |
| 2021/0384307 | A1 * | 12/2021 | Ma | H10D 30/6735 |

* cited by examiner

*Primary Examiner* — Tammara R Peyton
(74) *Attorney, Agent, or Firm* — Essential Patents Group, LLP

(57) ABSTRACT

Integrated circuit dies, systems, devices, and techniques, are described herein related to embedding a thermal solution into an integrated circuit die to heat the integrated circuit die when deployed in sub-zero environments, techniques for operating the thermal solution in a system, and techniques for fabricating the embedded thermal solution. The thermal solution includes a resistive heating element having the same material and substantially coplanar with components of devices of the integrated circuit die.

18 Claims, 11 Drawing Sheets

INTEGRATED THERMAL SOLUTION TO ENABLE OPERATION OF EMBEDDED PROCESSORS IN SUB-ZERO TEMPERATURES

BACKGROUND

Industrial and embedded systems such as computer systems having a processor, memory, input/output, etc. that have a dedicated function are an important aspect in may compute environments. Such industrial and embedded systems may be expected to operate in extreme environmental conditions that include temperatures ranging from sub-zero to temperatures higher than what are required for consumer systems.

Designing semiconductors to support operating conditions for consumer systems is well understood and is typically achieved by designing and characterizing the circuits to operate in desired temperature ranges or using thermal solutions at a system level. However, when such systems are expected to operate in extreme temperatures, special design features are required. For example, high temperatures can cause a system to throttle or fail, but sub-zero temperatures may make systems unable to boot. In addition to design modifications, high temperature challenges can be addressed with appropriate active or passing cooling solutions. However, for sub-zero temperatures, the design challenges are significant due to the limitations imposed by device physics. Since the design needs required to address high temperature and low temperature ranges are different, and often conflicting, implementing both can be complex, cost prohibitive, and sometimes infeasible.

For example, as the silicon junction temperature drops, the threshold voltage (i.e., the minimum gate-to-source voltage needed to create a conducting path between the source and drain terminals) increases. This increased threshold voltage adds additional challenges to the design, especially on the slow side where the baseline threshold voltage is higher and operating voltage lower. To compensate for this, current devices may be upsized, leading to increased power and capacitance, which in turn leads to limitations on the ultimate frequency the design can meet. Current solutions include system level heaters (e.g., cartridge heaters, aluminum nitride heaters, etc.). However, addition of such heaters adds to the overall system cost and complexity and other problems. For example, the supplemental energy required for such heating solution can be an issue in some cases, the time it takes to create optimal ambient temperate may be longer than desired, and, for form factors constrained designs, including a heater can cause additional challenges.

It is with respect to these and other considerations that the present improvements have been needed. Such improvements may become critical as the need to deploy industrial and embedded systems in a variety of contexts and environments becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
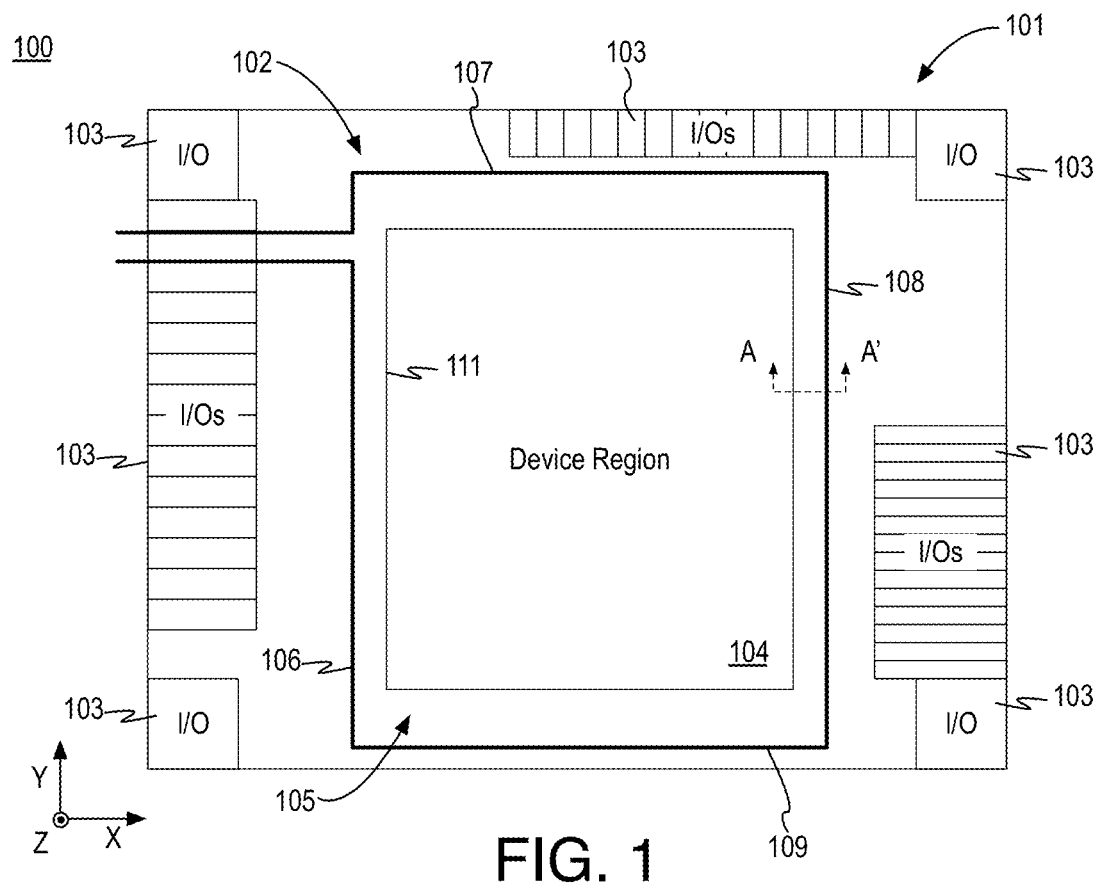
FIG. 1 illustrates a view of an example integrated circuit die including an embedded resistive heating element.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized, and structural and/or logical changes may be made without departing from the scope of claimed subject matter. It should also be noted that directions and references, for example, up, down, top, bottom, over, under, and so on, may be used to facilitate the discussion of the drawings and embodiments and are not intended to restrict the application of claimed subject matter. Therefore, the following detailed description is not to be taken in a limiting sense and the scope of claimed subject matter defined by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship, an electrical relationship, a functional relationship, etc.).

The terms "over," "under," "between," "on", and/or the like, as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening features. The term immediately adjacent indicates such features are in direct contact. Furthermore, the terms "substantially," "close," "approximately," "near," and "about," generally refer to being within +/−10% of a target value. The term layer as used herein may include a single material or multiple materials. As used in throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. The terms "lateral", "laterally adjacent" and similar terms indicate two or more components are aligned along a plane orthogonal to a vertical direction of an overall structure. Herein, the term "completely" indicates not less than 95%, in recognition that absolutes are typically not expected or attainable in patterning contexts. For example, overlaid patterns that substantially fill a region cover not less than 90% of the region while overlaid patterns that completely fill a region cover not less than 95% of the region. Perfectly overlaid patterns fill 99-100% of a merged region. As used herein, the terms "monolithic", "monolithically integrated", and similar terms indicate the components of the monolithic overall structure form an indivisible whole not reasonably capable of being separated.

Integrated circuit dies, systems, devices, and techniques, are described herein related to providing and operating an integrated thermal solution embedded in an integrated circuit die to enable operation of systems in sub-zero temperatures.

As discussed, there is a desire to operate computing systems such as embedded or industrial systems in extreme environments inclusive of sub-zero environments. For example, while consumer products are often designed to operate in 0° F. to 100° F. environments, it is desirable for embedded systems to operate in environments of less than 0° F. and, in some contexts, much less than 0° F. such as −20° F., −50° F., or even −80° F. to 100° F. environments. For example, computing systems may be needed in off shore drilling applications, remote weather service applications, automotive applications, and my others. As used herein, the term embedded system indicates a computer system (e.g., a processor, memory, I/O devices, etc.) that has a dedicated function within a larger system. Although discussed herein in the context of embedded systems, the devices and techniques discussed herein may be deployed in any suitable system.

In some embodiments, methods and articles of manufacture are discussed that deploy a diffusion layer on and/or within a semiconductor substrate as a thermal solution to enable operation of embedded processors in sub-zero temperature environments. The diffusion layer is also deployed as part of semiconductor devices of the part, such as a component of transistors formed on and/or within a semiconductor substrate. For example, the diffusion layer may include a silicide or a germanide deployed as a source and drain contact to doped source and drain materials of the transistor. The same diffusion layer may (including the same silicide or the same germanide, etc.) is deployed outside of the transistor as a relatively long and/or wide material to provide a resistive heater to the semiconductor substrate. Notably, the resistive heating element is formed using the same processing operations and does not require additional integration steps, materials, etc. Furthermore, the resistive heating element has the same material(s) as the corresponding device component(s) and is coplanar with the corresponding device component(s) as it is formed in the same manner Herein, the diffusion layer (i.e., part of the semiconductor device and material of the resistive heating element) are illustrated with respect to planar devices. However, such materials and components may be deployed in any context inclusive of fin field-effect transistors (FinFET), gate all around (GAA) transistors, and other transistor architectures.

The techniques and structures discussed herein provide a solution to enable operation of embedded systems in sub-zero temperatures by addition of a compact circuit, characterized, for example, as a compact integrated thermal element (CITE) integrated and embedded within an IC die. The CITE may be described as a resistive heating element and may also be characterized as a heating resistor, compact heater, integrated heating circuit, etc. The techniques and structures discussed herein provide for a design methodology of integrating a circuit to generate local heat on die to bring the overall die temperature to the designed operating range of the component. Such heating is achieved by adding the resistive heating element in the silicon layer (i.e., diffusion layer). The geometry of the resistive heating element may be provided based on the implementation trade-offs with respect to area used, circuit layout, and the required heating level. Furthermore, the discussed techniques provide for an embedded controller on the board/platform to control the resistive heating element within the silicon die.

The resistive heating element and related techniques and systems discussed herein offer the advantages of being compact, not adding a large footprint with respect to the IC die, relative ease of process and design integration, and robust system operation even at very low temperatures. Other advantages will be apparent to those of skill in the art.

FIG. 1 illustrates a view of an example integrated circuit die 100 including an embedded resistive heating element 102, arranged in accordance with at least some implementations of the present disclosure. In FIG. 1, as well as FIGS. 3-5, a top-down view of integrated circuit (IC) die 100 is provided with features selectively revealed to clearly illustrate the relevant components. Notably, not all components of FIGS. 1 and 3-5 are at the same z-height or visible in a top down view of IC die 100. As shown, IC die 100 includes a substrate 101 and a number of components formed within, on, and over substrate 101. Substrate 101 may be any suitable such as a semiconductor material. For example, substrate 101 may include a semiconductor material such as monocrystalline silicon (Si), germanium (Ge), silicon germanium (SiGe), a III-V materials based material (e.g., gallium arsenide (GaAs)), a silicon carbide (SiC), a sapphire ($Al_2O_3$), or any combination thereof. In some embodiments, substrate 101 is silicon. In some embodiments, substrate 101 is a substantially monocrystalline material. In some embodiments, substrate 101 includes a buried insulator layer (e.g., $SiO_2$), for example, of a semiconductor-on-insulator (SOI) substrate.

Device region 104 is formed on and over substrate 101 and within a region of IC die 100 such as a central region 105 as shown. Device region 104 includes any number, layout, etc. of active devices such as any number and layout of semiconductor devices. As used herein, the term active device indicates a component of IC die 100 used to provide logic, store information, transmit/receive signals, control or regulate voltages, etc. Such active devices may include logic devices such as transistors and other active and passive components such as diodes, resistors, capacitors, and so on. Device region 104 may be characterized as an active logic area, an active memory area, a device area, or the like. The active area or device region may provide any functionality for IC die 100 such as logic functions, memory, functions, or any other functional block. In some embodiments, IC die 100 is a system on a chip (SoC), which integrates most components of a system into IC die. As shown, device region 104 may be within a perimeter 111 thereof. Although illustrated with respect to a single rectangular device region 104, any number and shape of active device areas may be provided.

As discussed further herein, device region 104 may include a device layer and any number of interconnect layers above the device layer (e.g., at a greater z-height). Notably, the interconnect layers contact and provide routing between the functional terminals of the devices of device region 104. Furthermore, devices of device region 104 advantageously deploy diffusion layer materials (e.g., silicides, germanides, or similar materials) as part of the devices. The diffusion layer may be formed partially within and/or over substrate 101. In any case, as used herein, the term over substrate 101 indicates the diffusion layer (or other component) is over at least a portion of substrate 101 (in the z-direction) and may be on substrate 101, partially embedded in substrate 101, or over substrate 101 with an intervening material therebetween. For example, any number of semiconductor devices of device region 104 may deploy the diffusion layer (e.g., silicides, germanides, or similar materials) as at least a part of a source and/or drain structure thereof.

IC die 100 includes a number of input/outputs (I/Os) 103 that may connect to other devices using any suitable technique or techniques. In addition or in the alternative, IC die 100 may also include interconnects over device region 104 such as solder ball interconnects, interconnect pillars, and so on for flip-chip type connections. Although illustrated with a particular I/O structure for the sake of clarity, any suitable I/O structures or architectures may be used.

As shown, IC die 100 includes a resistive heating element 102 integrated and embedded in IC die 100. As discussed, resistive heating element 102 includes the same diffusion layer material deployed as a component in the devices of device region 104 and the diffusion layer material of resistive heating element 102 is coplanar (i.e., in the x-y plane) with the same diffusion layer material deployed in the devices of device region 104. For example, at least a portion of the source and drain material of transistors of device region 104 (e.g., source and drain silicide or germanide) may be deployed as the bulk material for resistive heating element 102. The bulk material is contacted in the same or similar manner with respect to contacting the source and drain metal (e.g., source and drain silicide or germanide) and routed to one of I/Os 103 through the same or similar interconnect structures as deployed over device region 104. For example, the same processing and structures used to interconnect the devices of device region 104 (e.g., metal contacts, metallization lines or routing layers, intervening vias, and so on) may be used to connect resistive heating element 102 to I/Os 103.

Resistive heating element 102 may be provided within device region 104 (as illustrated further herein below) and/or outside of device region 104. In some embodiments, resistive heating element 102 is provided only outside of device region 104, as shown in FIG. 1, such that resistive heating element 102 extends substantially around perimeter 111 of device region 104 and is absent within device region 104. For example, resistive heating element 102 may be immediately adjacent and surrounding perimeter 111 of device region 104 such that resistive heating element 102 is in a second region of IC die 100. As shown, resistive heating element 102 may have segments 106, 107, 108, 108, 109 each outside of a corresponding segment of perimeter 111. Such embodiments may offer advantageous ease of integration as device region 104 does not need to be modified or redesigned to deploy resistive heating element 102 in such contexts. In other embodiments, resistive heating element 102 is deployed in device region 104 and a region outside of device region 104. In some embodiments, resistive heating element 102 is deployed substantially within device region such that resistive heating element 102 only exits device region 104 to be coupled to I/Os 103.

Resistive heating element 102 may include any characteristics discussed herein inclusive of material choices, routing choices, sizes, etc. to provide heating to IC die 100 (and, optionally, other components of a system or package in which IC die 100 is deployed). Such heating is used, in sub-zero temperature environments, to meet a minimum boot temperature for IC die 100 and/or to maintain a minimum operating temperature of IC 100, as discussed further herein. Such heating of IC die 100 is provided using resistive heating and thermal conduction of the generated heat to other parts of IC die 100 and, optionally, other components outside of IC die 100.

Resistive heating (also known as Joule heating), as deployed by resistive heating element 102, is the process by which the passage of an electric current through a conductor or resistor produces heat. Joule's first law shows that the power of heating generated by an electrical conductor or resistor is proportional to the product of its resistance and the square of the current: $P \propto I^2R$. The techniques and components discussed herein provide resistive heating element 102 (e.g., a compact integrated thermal element, CITE) integrated in a diffusion layer as discussed herein, to raise the temperature of IC die 100 (e.g., a processor or SoC) to the range that substrate 101 (e.g., silicon) was originally designed for. In some embodiments, a minimum operating temperature threshold (MOTT) is defined as a design point of IC die 100, below which the system cannot be booted. The minimum operating temperature threshold may be any suitable temperature such as 0° C., for example.

Figure 2:
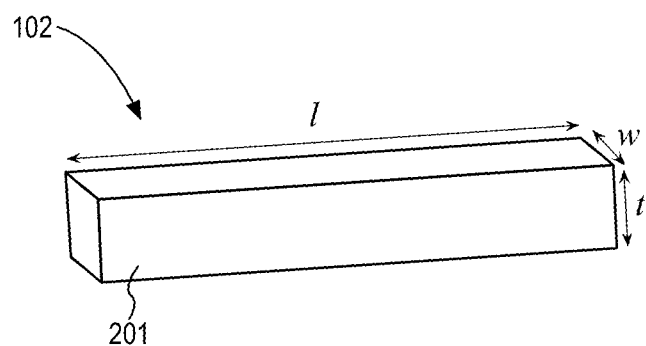
FIG. 2 illustrates an example portion of a resistive heating element.

FIG. 2 illustrates an example portion 201 of resistive heating element 102, arranged in accordance with at least some implementations of the present disclosure. Portion 201 of resistive heating element 102 may include any materials, dimensions, or the like discussed herein. Portion 201 is used to illustrate particular aspects of the discussed components and techniques. As shown, portion 201 of resistive heating element 102 includes a length, l, a width, w, and a thickness, t. For example, resistive heating element 102 may deploy a silicide or germanide at a length, l, a width, w, and a thickness, t. Such dimensions may be deployed as over length, average width, average thickness, etc. in application of heating element 102.

In the context of IC die 100, and the system in which it is deployed, the required length of resistive heating element 102 and the time required to reach the minimum operating temperature threshold or a minimum boot temperature threshold, depending on context, may be calculated and optimized based on the heat transfer properties of IC die 100, the materials and dimensions deployed therein inclusive of the material and dimensions of substrate 101, those of the devices of device region 104, those of the interconnects of device region 104, and so on, as well as the heat transfer properties of the package in which IC die 100 is deployed.

Notably, the amount of thermal energy stored or released as the temperature of a system changes may be calculated using Equation (1):

$$\Delta EtQ = m \times c \times \Delta\theta \quad (1)$$

where ΔEtQ is change in thermal energy (is measured in joules (J)), m is mass (measured in grams (g)), c is specific heat capacity (is measured in joules per gram per degree Celsius (J/g° C.)), and Δθ is temperature change (is measured in degrees Celsius (° C.)).

The total resistance of resistive heating element 102 depends on the length, width, thickness, and the resistivity of the material deployed in resistive heating element 102 and may be calculated using Equation (2):

$$R = \frac{\rho}{t} * \frac{l}{w} = R_s * \frac{l}{w} \quad (2)$$

where ρ is the resistivity, Rs is sheet resistance (Ω/□), □ is a dimensionless unit, and R=R_□*(# of squares).

The power dissipation of resistive heating element 102 may be calculated using the total resistance of resistive heating element 102 and the amount of current passing through resistive heating element 102 in accordance with Equation (3):

$$PCite = (I^2R) \quad (3)$$

where PCite is the power dissipation of resistive heating element 102, I is current, and R is the total resistance of resistive heating element 102.

The time required to reach the minimum operating temperature threshold (MOTT) or a minimum boot temperature threshold or the like may then be calculated as shown in Equation (4):

$$t_{MOTT} = (\Delta EtQ/PCite) \text{ tm} \quad (3)$$

where $t_{MOTT}$ is the time required to reach the minimum operating temperature threshold (MOTT) in seconds.

Based on the above calculations and the design requirements, different resistive heating element 102 topologies (e.g., CITE topologies) may be implemented as shown with respect to FIGS. 3-5 herein below Furthermore, depending on the available area and resistive heating element 102 topology, the time to reach the minimum operating temperature threshold (MOTT) or a minimum boot temperature threshold or the like can be calculated and optimized.

In some embodiments, resistive heating element 102 provides a particular amount of heat per time (e.g., Watts) for a given area of IC die 100. For example, the energy required to raise a single 50 mm² die temperature by 40° C. may be determined as follows. A typical 300 mm wafer weighs approximately 125 g. Given about 1,250 dies of 50 mm² yield from a 300 mm wafer, the weight of a 50 mm² is about 0.1 g. The specific heat of silicon is about 0.7 J/g° C. The energy (in Joules) to raise silicon by a particular temperature is given as E=[0.1 g]*[0.7 J/g° C.]*[degrees of temperature rise]. Using a temperature change of 40° C. gives E=[0.1 g]*[0.7 J/g° C.]*[40° C.]=2.8 J. Provided one joules is 0.000277778 Watt-hour, 2.8 J is about 0.0007777 W-hr. Assuming the temperature change is provided over about 10 min, 0.00467 Watts (or 4.67 mW) for is 10 minutes is needed to raise the temperature of the 50 mm² die 40° C. In this context, resistive heating element 102 provides about 0.0934 mW/mm² of die area. Other configurations may be used.

In some embodiments, resistive heating element 102 provides a range of about 0.05 to 0.3 mW/mm² to IC die 100. Higher outputs may be provided using the techniques and components discussed herein. In some embodiments, resistive heating element 102 provides not less than 0.07 mW/mm² to IC die 100. In some embodiments, resistive heating element 102 provides not less than 0.09 mW/mm² to IC die 100. In some embodiments, resistive heating element 102 provides not less than 0.1 mW/mm² to IC die 100. In some embodiments, resistive heating element 102 provides not less than 0.15 mW/mm² to IC die 100. In some embodiments, resistive heating element 102 provides not less than 0.2 mW/mm² to IC die 100.

Any resistive heating element 102 may provide such heating capabilities to IC die 100 at any suitable current. An exemplary resistive heating element 102 is evaluated for illustrative purposes. Assuming resistive heating element 102 is molybdenum silicide ($MoSi_2$), the specific heat and sheet resistance of the molybdenum silicide depends on various factors in manufacturing process. However, a typical sheet resistance of a molybdenum silicide film of 500 nm thickness when annealed at 1000° C. for min is about 1 Ohm/Sq. Assuming a total length of resistive heating element 102 routed around a 50 mm²(7 mm×7 mm) die IC die 100 is about 30 mm (or $30 \times 10^{-3}$ m) and a width of resistive heating element 102 of about 1 um (or $10^{-6}$ m), a total resistive of resistive heating element 102 is about $1*30 \times 10^3$ m/$10^{-6}$ m=$30 \times 10^3$ Ohm. Using the above example of about 4.67 mW of output energy is required: 4.67 mW=$4.67 \times 10^{-3}$ W=$I^2R$, gives $I^2 = 4.67 \times 10^{-3}$ W/$30 \times 10^3$ Ohm=$0.156 \times 10^{-6}$ A², which gives I=394 uA=~400 uA. In some embodiments, resistive heating element 102 is operated a current in the range of 150 to 800 uA. In some embodiments, resistive heating element 102 is operated at not less than 200 uA. In some embodiments, resistive heating element 102 is operated at not less than 300 uA. In some embodiments, resistive heating element 102 is operated at not less than 400 uA.

Figure 3:
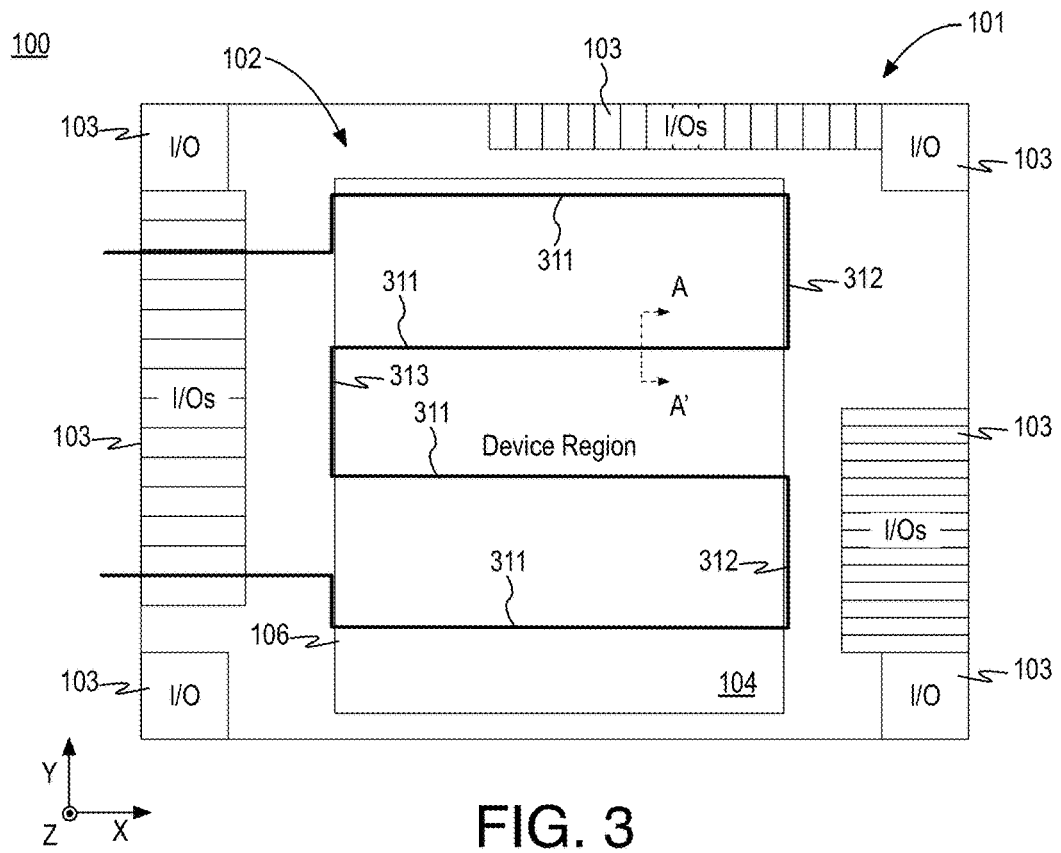
FIG. 3 illustrates a view of an example integrated circuit die including an embedded resistive heating element extending through a device region in a serpentine pattern.

FIG. 3 illustrates a view of an example integrated circuit die 100 including an embedded resistive heating element 102 extending through device region 104 in a serpentine pattern, arranged in accordance with at least some implementations of the present disclosure. In FIG. 3, IC die 100 and the components thereof may have any characteristics discussed herein. As shown, in the example of FIG. 3, resistive heating element 102 is at least partially within device region 104. Furthermore, example resistive heating element 102 has a serpentine pattern such that particular segments 311 are orthogonal to others of segments 312, 313.

For example, resistive heating element 102 may include a first of segments 311 (e.g., at a maximum y-dimension) extending in a first x-dimension adjacent one edge of device region 104 and substantially across device region 104. In the illustrated embodiment, segments 311 extend entirely across a width of device region 104 and into an adjacent region. In other embodiments, segments 311 do not extend outside of device region 104. The pattern continues with one of segments 312 orthogonal to the first of segments 311. For example, segments 312 may extend in a second y-dimension. The particular segment 312 extends only partially across a length of device region 104 such as about one-third of the length of device region 104 before the pattern includes another of segments 311. The pattern then continues with the second of segments 311 then adjoining a segment 313 that is again orthogonal to segments 311 but parallel with respect to segments 312. The pattern of exemplary resistive heating element 102 then continues in such a pattern in serpentine manner through device region 104 to distribute heat therein.

In the illustrated example, four segments 311 extend across a width of device region 104 to provide an increased total length of resistive heating element 102 within device region 104. In some embodiments, a ratio of the total length of resistive heating element 102 within device region 104 to a length or width (or both) of device region may be greater than a particular ratio to provide substantial heating to device region 104. In some embodiments, the ratio of the total length of resistive heating element 102 within device region 104 to a length or width (or both) of device region is greater than two. In some embodiments, the total length of resistive heating element 102 within device region 104 to a length or width (or both) of device region is greater than four. In some embodiments, the total length of resistive heating element 102 within device region 104 to a length or width (or both) of device region is greater than six. In some embodiments, the total length of resistive heating element 102 within device region 104 to a length or width (or both) of device region is greater than eight. Other values may be used depending on the environment and/or IC die 100 being deployed.

Figure 4:
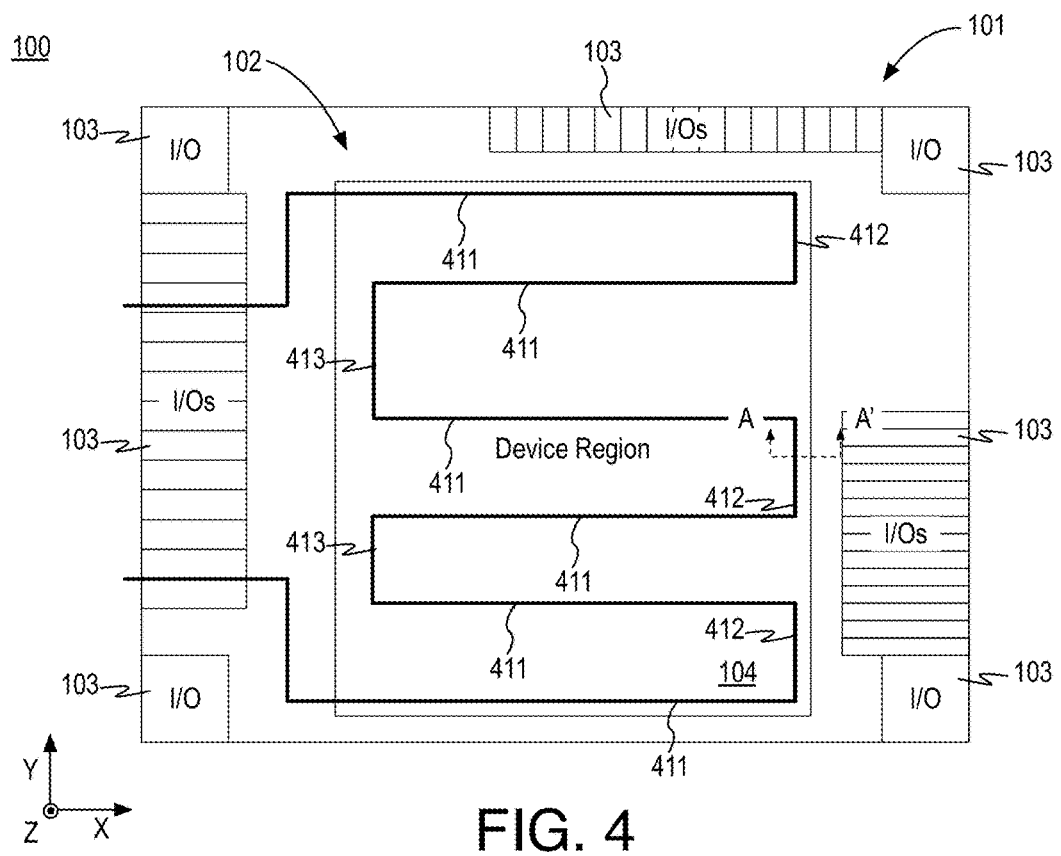
FIG. 4 illustrates a view of another example integrated circuit die including an embedded resistive heating element extending through a device region in a tighter serpentine pattern.

FIG. 4 illustrates a view of another example integrated circuit die 100 including an embedded resistive heating element 102 extending through device region 104 in a tighter serpentine pattern, arranged in accordance with at least some implementations of the present disclosure. In FIG. 4, IC die 100 and the components thereof may have any characteristics discussed herein. As shown, in the example of FIG. 4, resistive heating element 102 is at least partially within device region 104. Furthermore, example resistive heating element 102 has a serpentine pattern such that particular segments 411 are orthogonal to others of segments 412, 413.

As shown, resistive heating element 102 may include a first of segments 411 (e.g., at a maximum y-dimension) extending in a first x-dimension adjacent one edge of device region 104 and substantially across device region 104. In the illustrated embodiment, segments 411 do not extend entirely across a width of device region 104 and are within device region 104. In other embodiments, segments 411 extend outside of device region 104. The pattern continues with one of segments 412 orthogonal to the first of segments 411 such that segments 412 may extend in a second y-dimension. The particular segment 412 extends only partially across a length of device region 104 such as about one-fifth of the length of device region 104 before the pattern includes another of segments 411. The pattern then continues with the second of segments 311 then adjoining a segment 413 that is again orthogonal to segments 411 but parallel with respect to segments 412. The pattern of exemplary resistive heating element 102 then continues in such a pattern in serpentine manner through device region 104 to distribute heat therein.

In the illustrated example, six segments 411 extend across a width of device region 104 to provide an increased total length of resistive heating element 102 within device region 104. With reference to FIG. 3, any number of such segments may be deployed to provide any ratio of the total length of resistive heating element 102 within device region 104 to a length or width (or both) of device region. Furthermore, although illustrated with respect to segments 311, 411 extending in the x-direction and segments 312, 313, 412, 413 extending in the y-direction, other orientations may be provided with such orientations being parallel and orthogonal to edges of device region 104, or not. Similarly, although illustrated with respect to rectilinear patterns, resistive heating element 102 may be deployed using any patterns, segment to segment angles, and so on.

Figure 5:
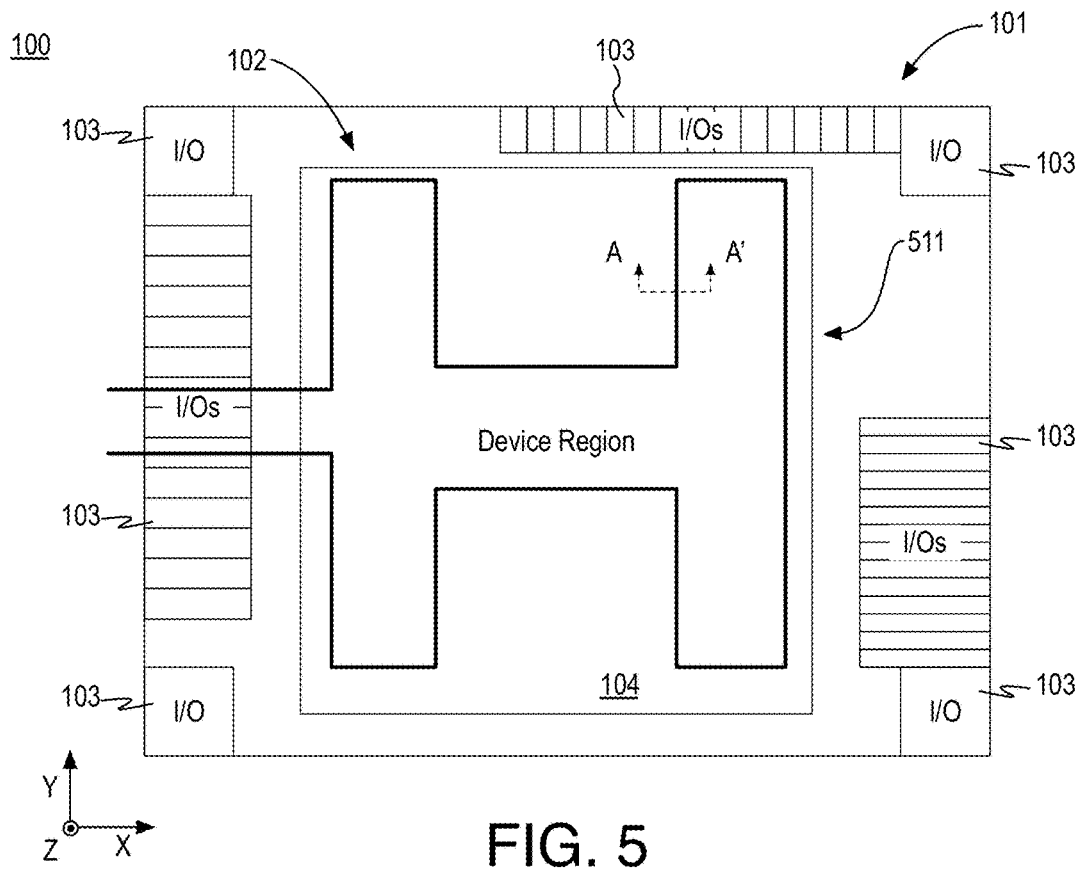
FIG. 5 illustrates a view of another example integrated circuit die including an embedded resistive heating element extending through a device region in an H-shaped rectilinear pattern.

FIG. 5 illustrates a view of another example integrated circuit die 100 including an embedded resistive heating element 102 extending through device region 104 in an H-shaped rectilinear pattern, arranged in accordance with at least some implementations of the present disclosure. In FIG. 5, IC die 100 and the components thereof may have any characteristics discussed herein. As shown, in the example of FIG. 5, resistive heating element 102 may be at least partially within device region 104. Furthermore, the example resistive heating element 102 of FIG. 5 has a rectilinear pattern such that particular segments 511 are orthogonal to others of segments 511 with the overall pattern provided by segments 511 having an H shape.

As shown, resistive heating element 102 may include a first of segments 511 extending into device region 104 (e.g., at the left of FIG. 5) in the x-dimension, which adjoins a second of segments 511, which extends in the y-dimension and begins the left top portion of the H pattern. The pattern continues in a rectilinear fashion such that each of segments 511 provides a segment of an open H pattern. As discussed, such rectilinear patterning provides a greater total length of resistive heating element 102 within device region 104. Any ratio of the total length of resistive heating element 102 within device region 104 to a length or width (or both) of device region discussed above may be achieved with the illustrated H pattern or any other suitable rectilinear pattern. Such patterning may be deployed to define sub-blocks of device region 104 and/or to provide efficiently distributed heating within device region 104.

Furthermore, in any of FIGS. 1 and 3-5 resistive heating element 102 may be contacted by first and second contacts coupled to resistive heating element 102. An exemplary contact is illustrated herein with respect to FIG. 11E. In some embodiments, the remainder of resistive heating element 102 is un-contacted. As used herein, the term un-contacted indicates the device or component (e.g., resistive heating element 102) is not contacted such that it may be accessed or activated by an outside device or controller. In some embodiments, the length of resistive heating element 102 between the first and second contacts is in the range of 20 mm to 40 mm. In some embodiments, the length of resistive heating element 102 between the first and second contacts is not less than 10 mm. In some embodiments, the length of resistive heating element 102 between the first and second contacts is not less than 20 mm. In some embodiments, the length of resistive heating element 102 between the first and second contacts is not less than 40 mm. In some embodiments, the length of resistive heating element 102 between the first and second contacts is not less than 50 mm. Other lengths may be used.

In some embodiments, a particular length of resistive heating element 102 per area of IC die 100 may be provided. In some embodiments, about 30 mm per 50 mm$^2$ (e.g., 0.6/mm) is used. In some embodiments, the ratio of the length of resistive heating element 102 to the area of IC die 100 (or to the area of active region 104) is not less than 0.3/mm. In some embodiments, the ratio of the length of resistive heating element 102 to the area of IC die 100 (or to the area of active region 104) is not less than 0.5 mm. In some embodiments, the ratio of the length of resistive heating element 102 to the area of IC die 100 (or to the area of active region 104) is not less than 0.6/mm. In some embodiments, the ratio of the length of resistive heating element 102 to the area of IC die 100 (or to the area of active region 104) is not less than 1/mm.

Resistive heating element 102 may have any suitable dimensions (length, width, thickness) and may deploy any suitable materials. Such characteristics are discussed further herein with respect to FIGS. 10 and 11A-11E. Discussion now turns to control of resistive heating element 102.

Figure 6:
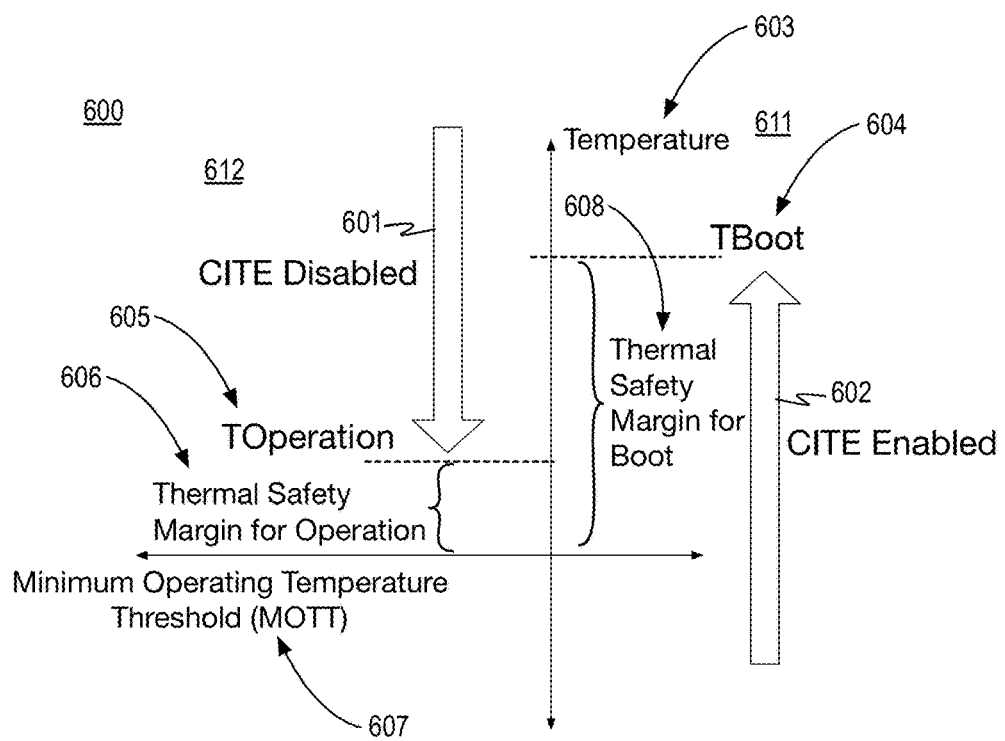
FIG. 6 illustrates an example diagram of temperature thresholds and various operations for enabling and disabling a resistive heating element.

FIG. 6 illustrates an example diagram 600 of temperature thresholds and various operations for enabling and disabling resistive heating element 102, arranged in accordance with at least some implementations of the present disclosure. In FIG. 6, the y-axis illustrates temperature 603, which may be measured on die (e.g., using a die level temperature sensor) or off die (e.g., using a package level temperature sensor), as discussed further herein below. The x-axis illustrates different states of the system over time (although such states may be experienced in any order).

Figure 9:
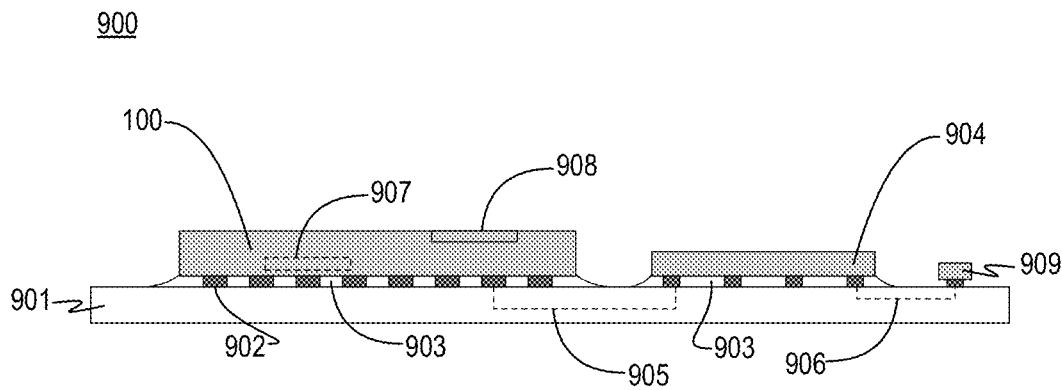
FIG. 9 illustrates a view of an example system including an integrated circuit die having an embedded resistive heating element and a corresponding low temperature controller.

For example, to boot and operate a system, such as the system illustrated with respect to FIG. 9 herein, a safety margin may be added to the minimum operating temperature threshold (MOTT) of the system. In some embodiments, a first temperature threshold is defined as a minimum temperature to boot the system. As used herein, the terms boot, boot up, booting, etc. indicate the process of starting a computer system and components thereof. For example, the boot up of a system may be substantially contemporaneous with the boot up of IC die 100 and such terms are applied to various components in the context of boot up operations. In some embodiments, a second temperature threshold is defined as a minimum temperature to operate the system. As used herein, the terms operation, system operation, etc. are used to indicate the system and particular components thereof are in a run state.

In some embodiments, a minimum boot up temperature and a minimum operating temperature of the system and IC die 100 are defined as shown in Equations (5):

$$\text{TBoot} = \text{MOTT} + \text{Safety margin for boot}$$

$$\text{TOperation} = \text{MOTT} + \text{Safety margin for operation} \qquad (5)$$

where TBoot is the minimum boot up temperature, Safety margin for boot is a relatively small (e.g., 3-8° C.) temperature margin over the discussed minimum operating temperature threshold (MOTT), TOperation is the minimum operating temperature, and Safety margin for operation is also relatively small (e.g., 3-8° C.) temperature margin over the discussed minimum operating temperature threshold (MOTT). In some embodiments, the Safety margin for boot is greater than the Safety margin for operation.

As shown in FIG. 6, a minimum operating temperature threshold (MOTT) 607 may be determined based on the characteristics of the system. In some embodiments, minimum operating temperature threshold (MOTT) 607 is about 0° C., although any suitable temperature may be deployed. FIG. 6 also illustrates a minimum operating temperature (TOperation) 605, which is above minimum operating temperature threshold 607 and provides for a thermal safety margin for operation 606 as discussed with respect to Equations (5). Similarly, a minimum boot up temperature (TBoot) 604, which is above both minimum operating temperature threshold 607 and minimum operating temperature (TOperation) 605 is provided Minimum boot up temperature (TBoot) 604 provides for a thermal safety margin for boot up 608 also as discussed with respect to Equations (5).

In a boot up phase 611, when the temperature is below minimum boot up temperature (TBoot) 604, resistive heating element 102 is enabled at enable operation 602 until minimum boot up temperature (TBoot) 604, at which time the system (and die 100) can be safely booted. Resistive heating element 102 may be disabled (not shown) prior to or after boot up of the system. In an operation phase 612, when the temperature is above minimum operating temperature (TOperation) 605, resistive heating element 102 is disabled at disable operation 601. If the system falls below minimum operating temperature (TOperation) 605, resistive heating element 102 may again be enabled until minimum operating temperature (TOperation) 605 is met or exceeded (e.g., by a safety margin, not shown).

In some embodiments, when the system is not yet booted in boot up phase 611, an on-die thermal sensor of IC die 100 is not accessible, so a temperature provided by a package temperature sensor (Tpackage) is used to determine when resistive heating element 102 is to be enabled. In some embodiments, A low temperature boot controller (LTBC) samples the package temperature (Tpackage) at regular intervals (Twait) until the temperate reaches above minimum boot up temperature (TBoot) 604. Once the temperature is above minimum boot up temperature (TBoot) 604, resistive heating element 102 is disabled and a boot sequence is unblocked. Once the system boots up, the system advance to an operation flow in operation phase 612.

During normal operation in operation phase 612, the on-die thermal sensor is utilized to monitor the processor temperature (Todts) and to ensure that temperature remains above minimum operating temperature (TOperation) 605. As long as temperature remains above minimum operating temperature (TOperation) 605, the system continues to operate normally. If the temperature drops to below minimum operating temperature (TOperation) 605, an on-die temperature controller (ODTC) or an off-die temperature controller will engage resistive heating element 102 to bring the temperature above minimum operating temperature (TOperation) 605.

Figure 7:
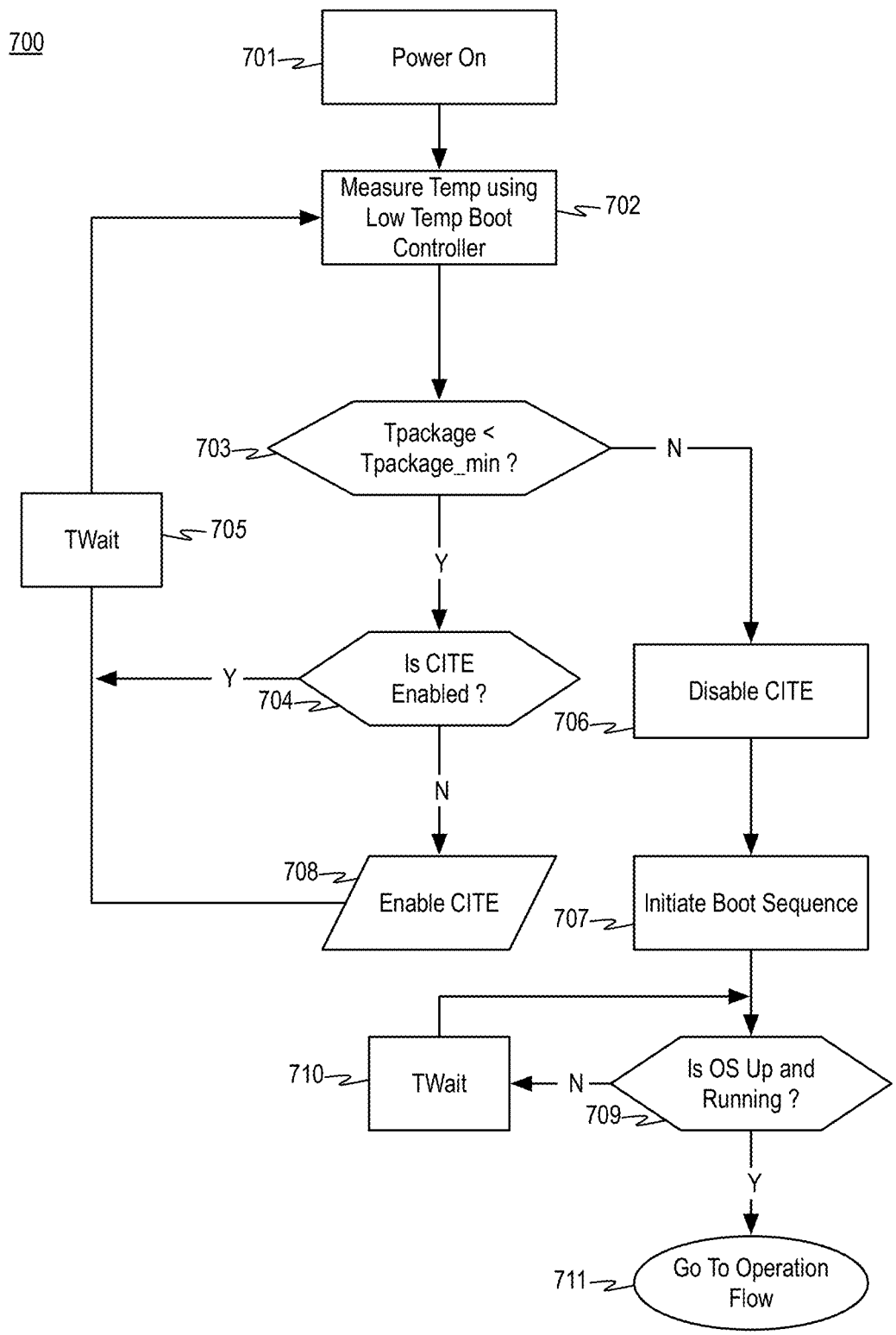
FIG. 7 is a flow diagram illustrating an example process for booting a system including a resistive heating element in an integrated circuit die.

FIG. 7 is a flow diagram illustrating an example process 700 for booting a system including resistive heating element 102 in integrated circuit die 100, arranged in accordance with at least some implementations of the present disclosure. For example, process 700 may be implemented by a system 900 as shown in FIG. 9 to provide boot up operations for a system including IC die 100 having an embedded resistive heating element 102.

Figure 8:
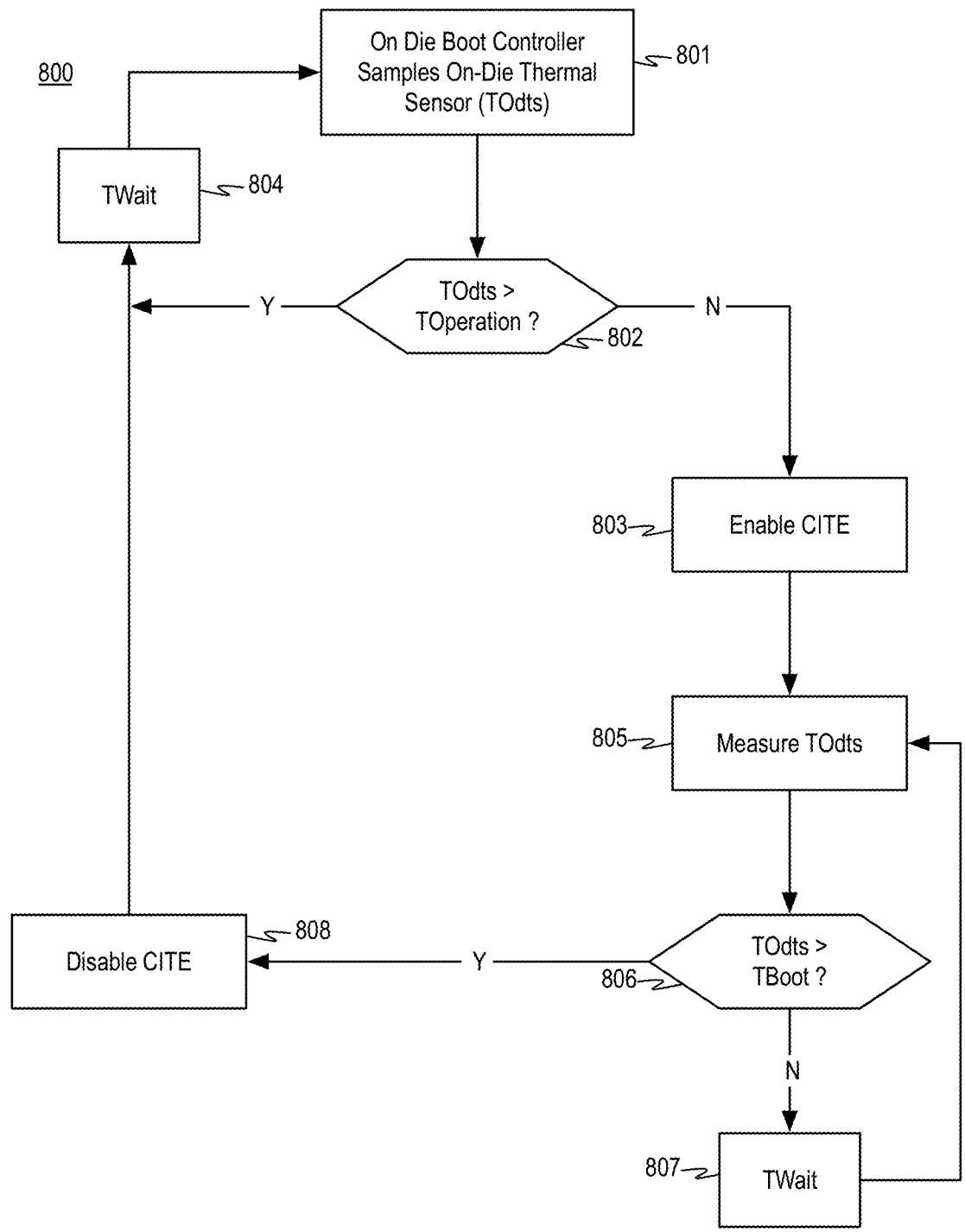
FIG. 8 is a flow diagram illustrating an example process for normal system operation for a system including a resistive heating element in an integrated circuit die.

FIG. 8 is a flow diagram illustrating an example process 800 for normal system operation for a system including resistive heating element 102 in integrated circuit die 100, arranged in accordance with at least some implementations of the present disclosure. For example, process 800 may be implemented by system 900 to provide normal operations for a system including IC die 100 having an embedded resistive heating element 102.

FIG. 9 illustrates a view of an example system 900 including an integrated circuit die 100 having embedded resistive heating element 102 and a corresponding low temperature controller 904, arranged in accordance with at least some implementations of the present disclosure. As shown in FIG. 9, IC die 100, including resistive heating element 102 (not shown) is coupled to a package substrate 901 via interconnects 902. Similarly, low temperature controller 904 and a package temperature sensor 909 are coupled to package substrate 901 via interconnects 902. An underfill material 903 may be provide between package substrate 901 and one, some, or all of IC die 100, low temperature controller 904, and a package temperature sensor 909.

As shown, low temperature controller 904 may receive a temperature from package temperature sensor 909 via interconnect 906 such that the temperature readings are provided at regular intervals, on demand, at changes in temperature, or the like. Similarly, low temperature controller 904 is coupled to IC die 100 via interconnect 905 and, in particular resistive heating element 102 of IC die 100, such that low temperature controller 904 may enable or power resistive heating element 102 and disable or remove power from resistive heating element 102, either directly or by signaling IC die 100. Furthermore, IC die 100 may include an on-die temperature sensor 908 and control logic 907 to receive temperature readings from on-die temperature sensor 908 and to deploy resistive heating element 102. For example, before boot, resistive heating element 102 may be controlled by low temperature controller 904 and, after boot, and resistive heating element 102 may be controlled by low temperature controller 904 or control logic 907.

Returning to FIG. 7, process 700 begins at operation 701 where the system is powered on by an operator (e.g., by depression of an on button) or by a request from another device or system. Notably, a minimum temperature, Tpackage_min, may be defined as a minimum temperature at which we resistive heating element 102 is enabled. In some embodiments, Tpackage_min may be defined as follows in Equation (6):

$$Tpackage\_min = TBoot - Tpackage\_delta \quad (5)$$

where Tpackage_delta is a small differential temperature (e.g., 1-5° C.) that depends on the package materials and/or package type.

After power on during the boot phase, low temperature controller 904 monitors a boot status register bit (BSR bit). If the system is not booted, then, at power on, low temperature controller 904 monitors the package temperature (Tpackage) at operation 702. For example, the temperature may be measure using package temperature sensor 909 and monitored by low temperature controller 904.

At operation 703, low temperature controller 904 determines whether the monitored temperature of the package (Tpackage) is less than the minimum package temperature (Tpackage_min). If so, processing continues at operation 704, where a determination is made as to whether resistive heating element 102 (CITE) is enabled. If not, processing continues at operation 708, resistive heating element 102 (CITE) is enabled. In some embodiments, resistive heating element 102 is enabled by low temperature controller 904 powering on resistive heating element 102. In some embodiments, low temperature controller 904 may itself provide the power or power may be delivered through package substrate 901 and low temperature controller 904 may provide a signal so power is provided.

Continuing from operation 708 or from operation 704 in examples where resistive heating element 102 (CITE) was already enabled, the system may wait a particular duration (e.g., 5-60 seconds) at operation 705 before return to operation 702 where such processing repeats until, at decision operation 703, a determination is made that the temperature of the package (Tpackage) is not less than the minimum package temperature (Tpackage_min) (i.e., the temperature of the package meets or exceeds the minimum package temperature). In some embodiments, minimum package temperature (Tpackage_min) is minimum boot up temperature (TBoot) 604.

When the temperature of the package meets or exceeds the minimum package temperature, processing continues from operation 703 at operation 706 where resistive heating element 102 (CITE) is disabled and, at operation 707, where the boot sequence for the system (and IC die 100) is initiated.

Processing continues at operation 709 where a determination is made as to whether the operating system (OS) of the system and IC die 100 is up and running (i.e., low temperature controller 904 monitors the boot status register bit, BSR bit). If not, the system may wait a particular duration 710 until it is determined that the operating system is running satisfactorily. Although not shown in FIG. 7, after a time out period, process 700 may return to operation 707 (to attempt another boot initiation) or operation 702 (to provide additional heat and temperature verification prior to another boot initiation). In some embodiments, when such boot failure processing returns process 700 to operation 702, the discussed processing may be repeated with an increase of the minimum package temperature (Tpackage_min).

After successful boot up and operation system operation, process 700 ends at operation 711 where the system enters an operational state. In some embodiments, low temperature controller 904 hands off control to control logic 907 (e.g., an on-die boot controller, ODBC) at operation 711 to perform process 800. In other embodiments, low temperature controller 904 may continue to provide control in the operational phase and low temperature controller 904 may perform process 800.

Turning now to FIG. 8, processing proceeds at operation 801, where control logic 907 (e.g., an on-die boot controller, ODBC) samples on-die temperature sensor 908. For example, control logic 907 may receive a temperature (TOdts) from on-die temperature sensor 908 at regular intervals, on demand, at changes in temperature, or the like. Processing continues at operation 802, where a determination is made as to whether the monitored temperature (TOdts) exceeds minimum operating temperature (TOperation) 605. If so, processing continues at operation 804, where a particular wait duration is applied until the on-die temperature (TOdts) is again monitored (at operation 801) and evaluated against minimum operating temperature (TOperation).

Returning to operation 802, when the on-die temperature (TOdts) is at or below the minimum operating temperature (TOperation), processing continues at operation 803 where resistive heating element 102 (CITE) is enabled. In some embodiments, resistive heating element 102 is enabled by control logic 907 providing a signal for system 900 to power resistive heating element 102. Processing continues at operation 805, where the on-die temperature (TOdts) is measured (as discussed with respect to operations 801, 802) and at operation 806 where the on-die temperature (TOdts) is compared to the minimum boot up temperature (TBoot).

If the on-die temperature (TOdts) exceeds the minimum boot up temperature (TBoot), which is greater than the minimum operating temperature (TOperation), processing continues at operation 808, where resistive heating element 102 (CITE) is disabled. If the on-die temperature (TOdts) does not yet exceed the minimum boot up temperature (TBoot), processing continues at operation 807, where a wait duration is applied until processing is repeated at operations 803, 805 until the minimum boot up temperature (TBoot) is exceed and resistive heating element 102 (CITE) is disabled (at operation 808). Such techniques may advantageously reset the system to a temperate above the minimum boot up temperature (TBoot) when the temperature falls below minimum operating temperature (TOperation) to provide a greater temperature buffer (e.g., safety buffer) for the system.

Figure 10:
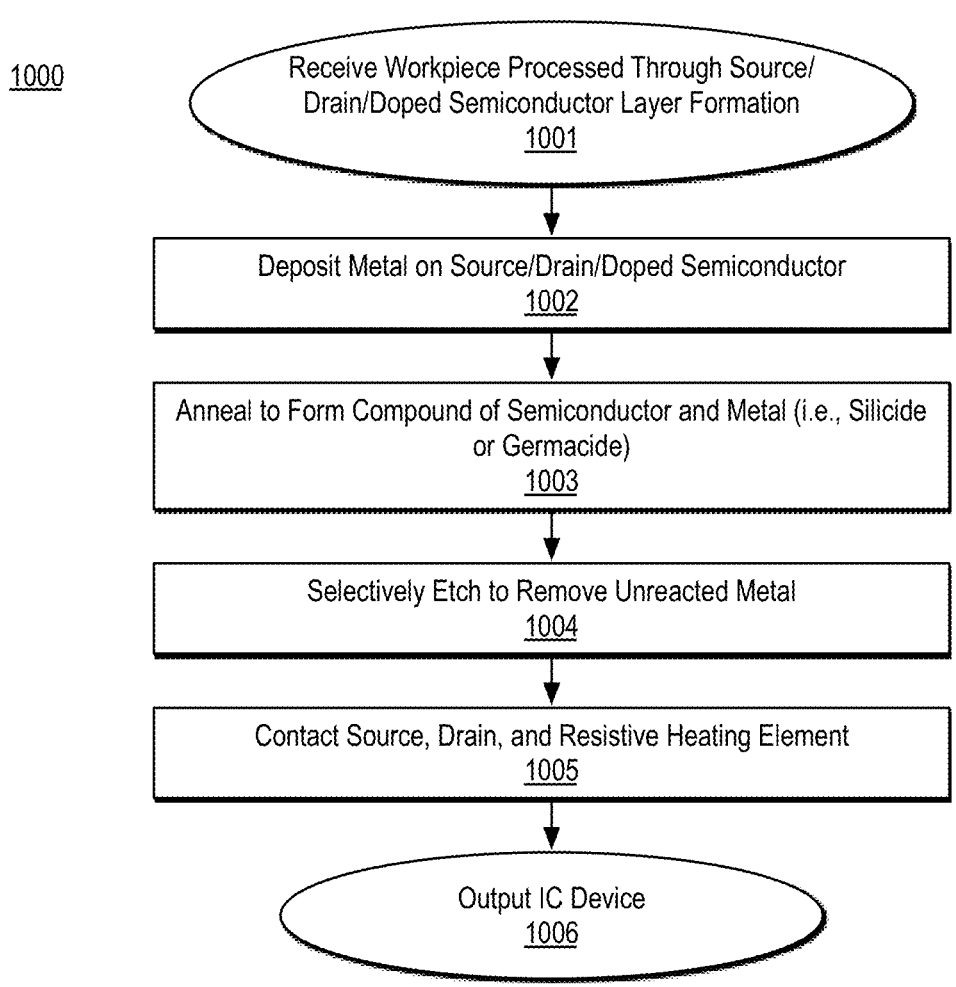
FIG. 10 is a flow diagram illustrating an example process for fabricating an integrated circuit die having an embedded resistive heating element.

FIG. 10 is a flow diagram illustrating an example process 1000 for fabricating an integrated circuit die having embedded resistive heating element 102, arranged in accordance with at least some implementations of the present disclosure. For example, process 1000 may be implemented to fabricate device structures illustrated in FIGS. 11A-11E.

FIGS. 11A, 11B, 11C, 11D, and 11E are cross-sectional side views taken at a cut A-A' as shown in FIGS. 1 and 3-5 of example integrated circuit device structures as particular fabrication operations are performed, arranged in accordance with at least some implementations of the present disclosure.

With reference to FIG. 10, process 1000 begins at operation 1001, where a work piece is received for processing. For example, a partially fabricated wafer may be received for processing such that the wafer is mid-process flow having completed source and drain semiconductor formation and, contemporaneously, formation of a doped semiconductor layer for fabrication of an embedded heating element. Such source, drain, and doped semiconductor layer may be formed by doping a semiconductor material (e.g., via implant and anneal), by epitaxial growth of doped semiconductor materials, or the like.

Figure 11A:
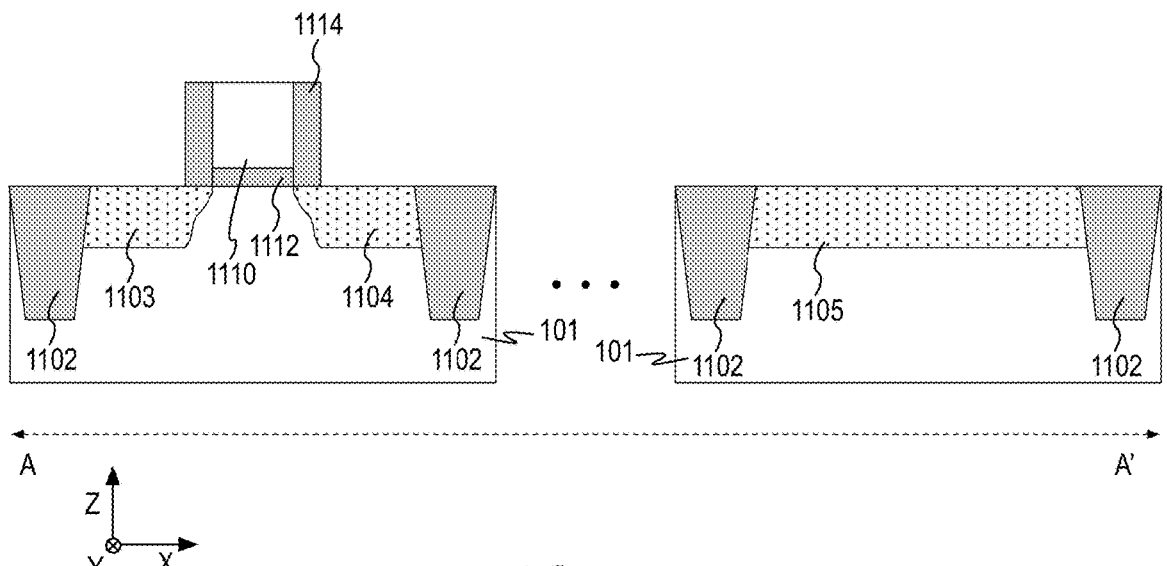
FIGS. 11A, 11B, 11C, 11D, and 11E are cross-sectional side views taken at a cut shown in FIGS. 1 and 3-5 of example integrated circuit device structures as particular fabrication operations are performed.

FIG. 11A illustrates a cross-sectional view of an integrated circuit device structure 1151 received at operation 1001. In the view of FIGS. 11A-11F, the integrated circuit device structure is shown with a split view inclusive of a semiconductor device (i.e., a device in device region 104) separated from an embedded resistive heating element (at various stages of fabrication). It will be appreciated the semiconductor device and the embedded resistive heating element may be located at any suitable positions in IC die 100.

As shown, integrated circuit device structure 1151 includes a substrate 101, isolation structures 1102, a source 1103, a drain 1104, a gate electrode 1110, a gate dielectric 1112, sidewall spacers 1114, and a doped semiconductor material 1105. Notably, source 1103, drain 1104, a channel (not labeled) between source 1103 and drain 1104, gate electrode 1110, gate dielectric 1112, and sidewall spacers 1114 are components of a transistor in device region 104. Furthermore, doped semiconductor material 1105 will be used to fabricate embedded resistive heating element 102, as discussed further herein below. Notably, source 1103, drain 1104 and doped semiconductor material 1105 are the same materials formed using the same fabrication processing.

Substrate 101, isolation structures 1102, source 1103, drain 1104, and doped semiconductor material 1105, gate electrode 1110, gate dielectric 1112, and sidewall spacers 1114 may be any suitable material and may have any suitable dimensions. Although illustrated with respect to a planar transistor device, the integrated circuit device structures discussed herein may be deployed using any transistor architecture. For example, the devices of device region 104 may be fin field-effect transistors (FinFETs), gate all around (GAA transistors), or any other transistor architectures.

Substrate 101 may include a semiconductor material such as monocrystalline silicon, germanium, silicon germanium, a III-V materials based material (e.g., gallium arsenide), a silicon carbide, a sapphire, or any combination thereof. Isolation structures 1102 may include any suitable dielectric material(s) such as silicon oxide or related materials. Gate dielectric 1112 may include any suitable gate dielectric such as a high-k gate dielectric material (i.e., having a higher dielectric constant than silicon oxide) and gate electrode 1110 may include any suitable material or materials such as work function metals. Sidewall spacers 1114 may include dielectric materials such as silicon nitride or the like.

As discussed, source 1103, drain 1104, and doped semiconductor material 1105 may be the same material. In some embodiments, source 1103, drain 1104, and doped semiconductor material 1105 include doped silicon. In some embodiments, source 1103, drain 1104, and doped semiconductor material 1105 include doped germanium. Dopants that may be present in source 1103, drain 1104, and doped semiconductor material 1105 include boron, aluminum, gallium, indium, phosphorous, arsenic, and antimony. Other material systems may be used.

Returning to FIG. 10, processing continues at operation 1002, where a metal layer is deposited on the source, drain, and doped semiconductor material. The metal layer may be deposited using any suitable technique or techniques such as electroplating techniques, sputtering techniques, atomic layer deposition techniques, chemical vapor deposition techniques, etc. The metal layer may include any metal or metals to form a silicide, a germanide, or, generally a compound including a semiconductor and a more electropositive element. In some embodiments, the metal layer includes one or more of nickel, cobalt, tungsten, tantalum, titanium, platinum, or palladium. Other metals may be used.

Figure 11B:
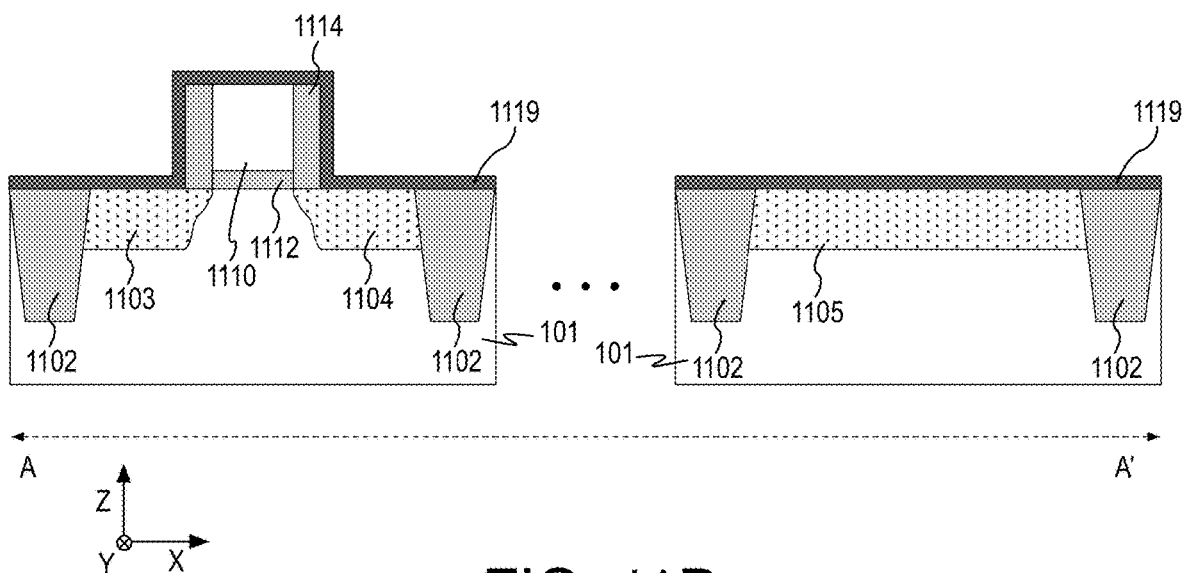

FIG. 11B illustrates an integrated circuit device structure 1152 similar to integrated circuit device structure 1151 after the deposition of a metal layer 1119. As discussed, metal layer 1119 may include one or more of nickel, cobalt, tungsten, tantalum, titanium, platinum, or palladium. Metal layer 1119 may be deposited to any suitable thickness to provide material for subsequent formation of silicide, germanide, or similar compound in source 1103, drain 1104, and doped semiconductor material 1105. For example, metal layer 1119 may have a thickness in the range of 50 to 1 micron. In some embodiments, metal layer 1119 has a thickness of about 500 nm.

Returning to FIG. 10, processing continues at operation 1003, where an anneal operation is performed to form the silicide, germanide, or similar compound. The anneal operation may be performed using any suitable technique or techniques such as rapid thermal anneal techniques. In some embodiments, the anneal is performed at a maximum temperature in the range of 300° C. to 700° C. In some embodiments, the anneal is performed in performed in an inert environment absent water or oxygen such as a substantially pure nitrogen environment.

Figure 11C:
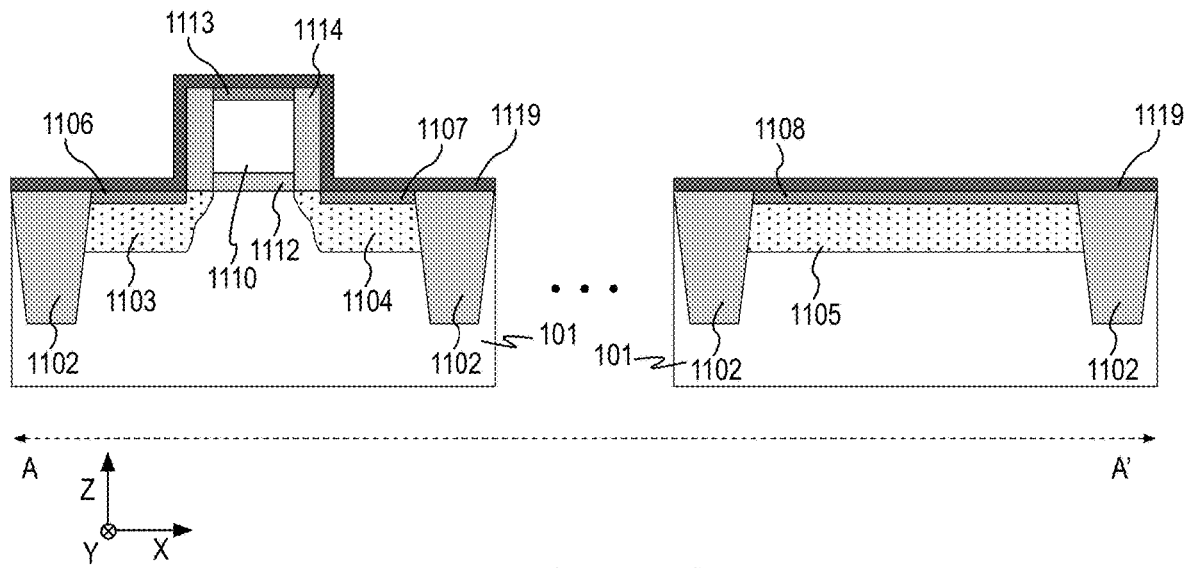

FIG. 11C illustrates an integrated circuit device structure 1153 similar to integrated circuit device structure 1152 after an anneal operation is performed to form source structure 1106, drain structure 1107, and resistive heating element portion 1108, such that each includes a silicide, germanide, or a similar compound (e.g., a compound including a semiconductor and a more electropositive element). In the context of the transistor of integrated circuit device structure 1153, the silicide, germanide, or a similar compound may provide reduced resistance to subsequent contact to source 1103 and drain 1104. In the context of the resistive heating element, the silicide, germanide, or a similar compound provides a resistive metal to provide Joule heating as discussed herein. As shown, a silicide, germanide, or similar compound may also be formed as gate structure 1113, although in some embodiments, no such material is formed.

The silicide, germanide, or a similar compound of source structure 1106, drain structure 1107, and resistive heating element portion 1108 may be any suitable material or material system. In some embodiments, source structure 1106, drain structure 1107, and resistive heating element portion 1108 include nickel silicide (i.e., nickel and silicon). In some embodiments, source structure 1106, drain structure 1107, and resistive heating element portion 1108 include cobalt silicide (i.e., cobalt and silicon). In some embodiments, source structure 1106, drain structure 1107, and resistive heating element portion 1108 include tungsten silicide (i.e., tungsten and silicon). In some embodiments, source structure 1106, drain structure 1107, and resistive heating element portion 1108 include tantalum silicide (i.e., tantalum and silicon). In some embodiments, source structure 1106, drain structure 1107, and resistive heating element portion 1108 include titanium silicide (i.e., titanium and silicon). In some embodiments, source structure 1106, drain structure 1107, and resistive heating element portion 1108 include platinum silicide (i.e., platinum and silicon). In some embodiments, source structure 1106, drain structure 1107, and resistive heating element portion 1108 include palladium silicide, (i.e., palladium and silicon). In some embodiments, source structure 1106, drain structure 1107, and resistive heating element portion 1108 include molybdenum silicide, (i.e., molybdenum and silicon). Source structure 1106, drain structure 1107, and resistive heating element portion 1108 may include any combination of such materials.

In some embodiments, source structure 1106, drain structure 1107, and resistive heating element portion 1108 include nickel germanide (i.e., nickel and germanium). In some embodiments, source structure 1106, drain structure 1107, and resistive heating element portion 1108 include cobalt germanide (i.e., cobalt and germanium). In some embodiments, source structure 1106, drain structure 1107, and resistive heating element portion 1108 include tungsten germanide (i.e., tungsten and germanium). In some embodiments, source structure 1106, drain structure 1107, and resistive heating element portion 1108 include tantalum germanide (i.e., tantalum and germanium). In some embodiments, source structure 1106, drain structure 1107, and resistive heating element portion 1108 include titanium germanide (i.e., titanium and germanium). In some embodiments, source structure 1106, drain structure 1107, and resistive heating element portion 1108 include platinum germanide (i.e., platinum and germanium). In some embodiments, source structure 1106, drain structure 1107, and resistive heating element portion 1108 include palladium germanide (i.e., palladium and germanium). In some embodiments, source structure 1106, drain structure 1107, and resistive heating element portion 1108 include molybdenum germanide, (i.e., molybdenum and germanium).

Returning to FIG. 10, processing continues at operation 1004, where a selective etch is performed to remove excess portions of the metal layer deposited at operation 1002 selective to the compound formed at operation 1003. For example, the selective etch is to leave as much of the silicide, germanide, or a similar compound as possible while removing the metal deposited at operation 1002. Such processing may be performed using any selective etch techniques. In some embodiments, after selective etch a second anneal is performed using any processing conditions discussed with respect to operation 1003.

Figure 11D:
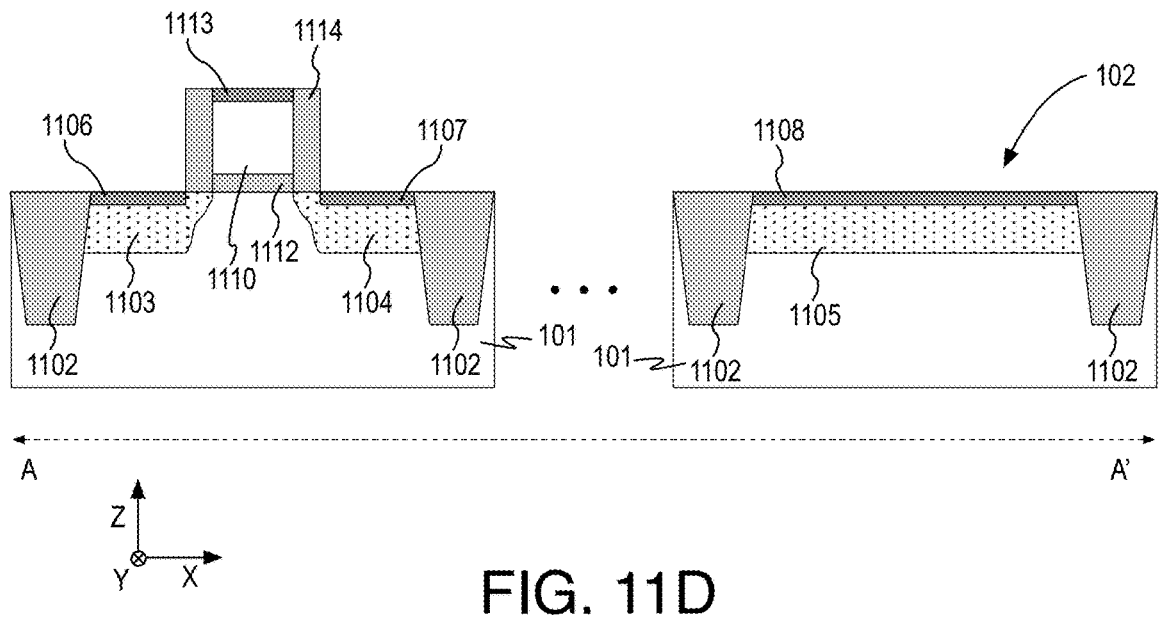

FIG. 11D illustrates an integrated circuit device structure 1154 similar to integrated circuit device structure 1153 after the selective removal of unreacted portions of metal layer 1119 while leaving source structure 1106, drain structure 1107, and resistive heating element portion 1108.

Returning to FIG. 10, processing continues at operation 1005, where the source, drain, gate, and resistive heating element are contacted by metal contacts. Subsequently, any number of metallization layers and intervening layers (together, interconnect levels) may be formed over the contacts. The contacts and interconnect levels may be formed using any suitable technique or techniques such as bulk metal deposition and patterning, damascene or dual damascene techniques, and the like.

Figure 11E:
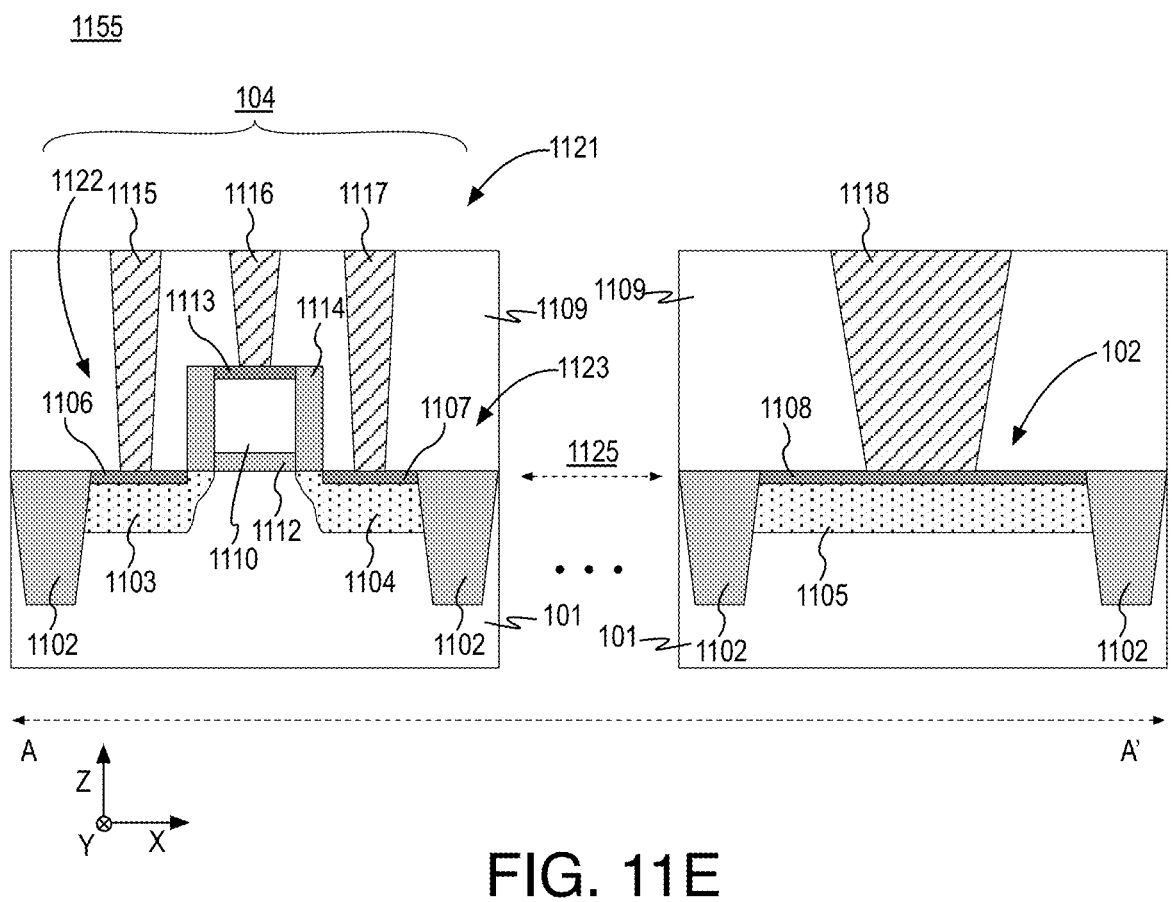

FIG. 11E illustrates an integrated circuit device structure 1155 similar to integrated circuit device structure 1154 after the formation of a source contact 1115, a drain contact 1117, a gate contact 1116, and a resistive heating element contact 1118, as well as a dielectric layer 1109. Such contacts and dielectric layer 1109 may be formed using any suitable technique or techniques such as forming a bulk dielectric layer, patterning contact holes in the bulk dielectric layer, depositing metal in the patterned contact holes, and planarization techniques. Other techniques may be deployed. As shown in FIG. 11E, a transistor device 1121 includes a source structure 1122 including source 1103 and source structure 1106 (e.g., a silicide or germanide), a drain structure 1123 including drain 1104 and drain structure 1107 (e.g., a silicide or germanide), a channel between source 1103 and drain 1104, gate electrode 1110, gate dielectric 1112, sidewall spacers 1114, source contact 1115, drain contact 1117, and gate contact 1116. Integrated circuit device structure 1155 also includes embedded resistive heating element 102 including resistive heating element portion 1108 (e.g., a silicide or germanide having the same composition as source structure 1106 and drain structure 1107) and resistive heating element contacts 1118. As shown, source structure 1106, drain structure 1107, and resistive heating element portion 1108 are coplanar 1125 such that they are substantially aligned in the x-y plane.

Returning to FIG. 10, processing finishes at operation 1006, where the resultant integrated circuit device structure is further processed and output. For example, backend processing may be completed, IC dies 100 may be segmented from the work piece wafer and the IC dies 100 may be packaged with other suitable components to provide system 900.

Figure 12:
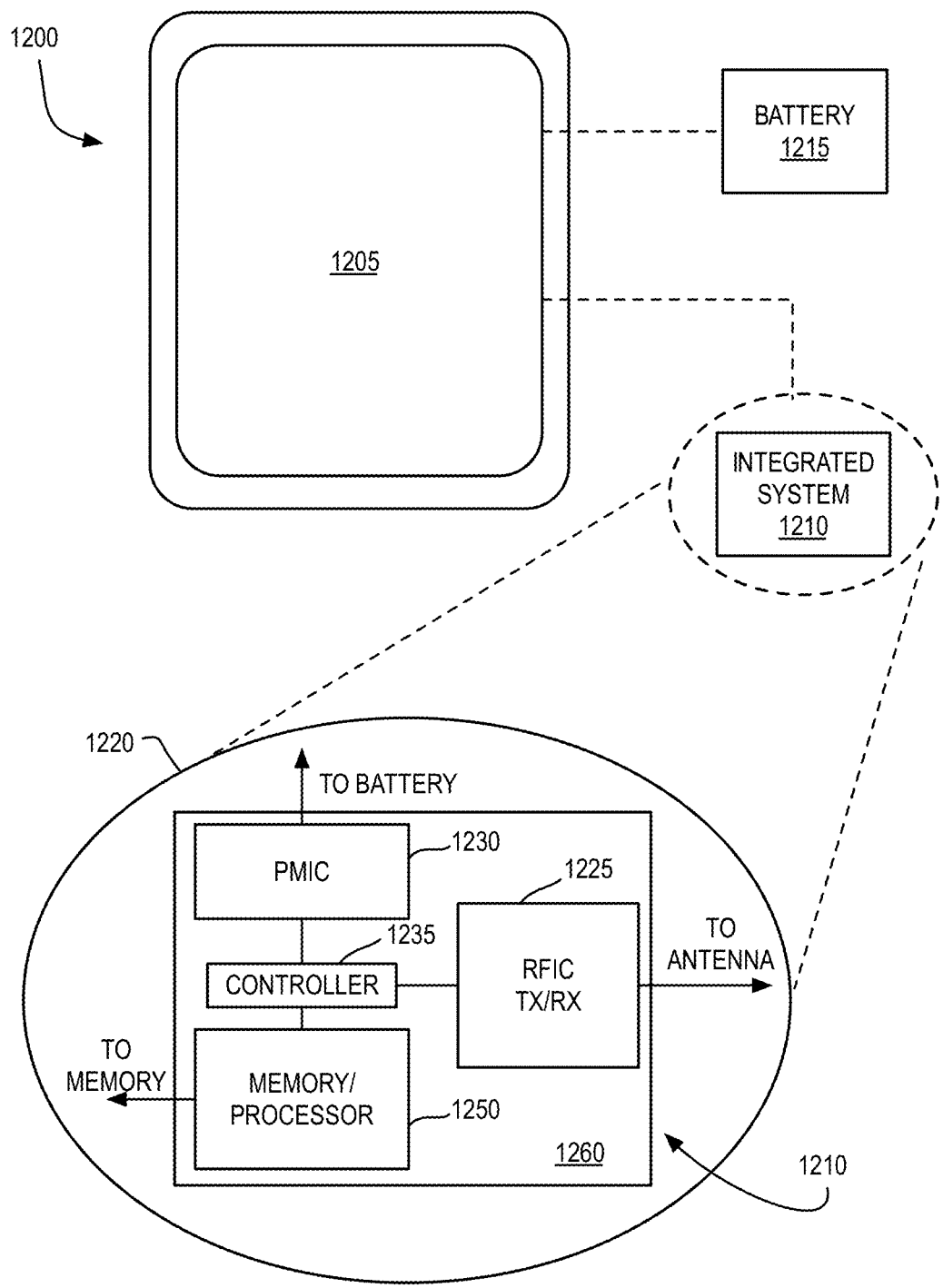
FIG. 12 is an illustrative diagram of a mobile computing platform employing an integrated resistive heating element.

FIG. 12 is an illustrative diagram of a mobile computing platform 1200 employing an integrated resistive heating element, arranged in accordance with at least some implementations of the present disclosure. Any device or structure having any components, materials, or characteristics discussed herein may be implemented by any component of mobile computing platform 1200. Mobile computing platform 1200 may be any portable device configured for each of electronic data display, electronic data processing, wireless electronic data transmission, or the like. For example, mobile computing platform 1200 may be any of a tablet, a smart phone, a netbook, a laptop computer, etc. and may include a display screen 1205, which in the exemplary embodiment is a touchscreen (e.g., capacitive, inductive, resistive, etc. touchscreen), a chip-level (system on chip—SoC) or package-level integrated system 1210, and a battery 1215. Battery 1215 may include any suitable device for providing electrical power such as a device consisting of one or more electrochemical cells and electrodes to couple to an outside device. Mobile computing platform 1200 may further include a power supply to convert a source power from a source voltage to one or more voltages employed by other devices of mobile computing platform 1200.

Integrated system 1210 is further illustrated in the expanded view 1220. In the exemplary embodiment, packaged device 1250 (labeled "Memory/Processor" in FIG. 12) includes at least one memory chip (e.g., RAM), and/or at least one processor chip (e.g., a microprocessor, a multi-core microprocessor, or graphics processor, or the like). In an embodiment, the package device 1250 is a microprocessor including an SRAM cache memory. As shown, device 1250 may employ a die or device having any transistor structures and/or related characteristics discussed herein. Packaged device 1250 may be further coupled to (e.g., communicatively coupled to) a board, a substrate, or an interposer 1260 along with, one or more of a power management integrated circuit (PMIC) 1230, RF (wireless) integrated circuit (RFIC) 1225 including a wideband RF (wireless) transmitter and/or receiver (TX/RX) (e.g., including a digital baseband and an analog front end module further comprises a power amplifier on a transmit path and a low noise amplifier on a receive path), and a controller 1235 thereof. In general, packaged device 1250 may be also be coupled to (e.g., communicatively coupled to) display screen 1205.

Functionally, PMIC 1230 may perform battery power regulation, DC-to-DC conversion, etc., and so has an input coupled to battery 1215 and with an output providing a current supply to other functional modules. In an embodiment, PMIC 1230 may perform high voltage operations. As further illustrated, in the exemplary embodiment, RFIC 1225 has an output coupled to an antenna (not shown) to implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. In alternative implementations, each of these board-level modules may be integrated onto separate ICs coupled to the package substrate of packaged device 1250 or within a single IC (SoC) coupled to the package substrate of the packaged device 1250.

Figure 13:
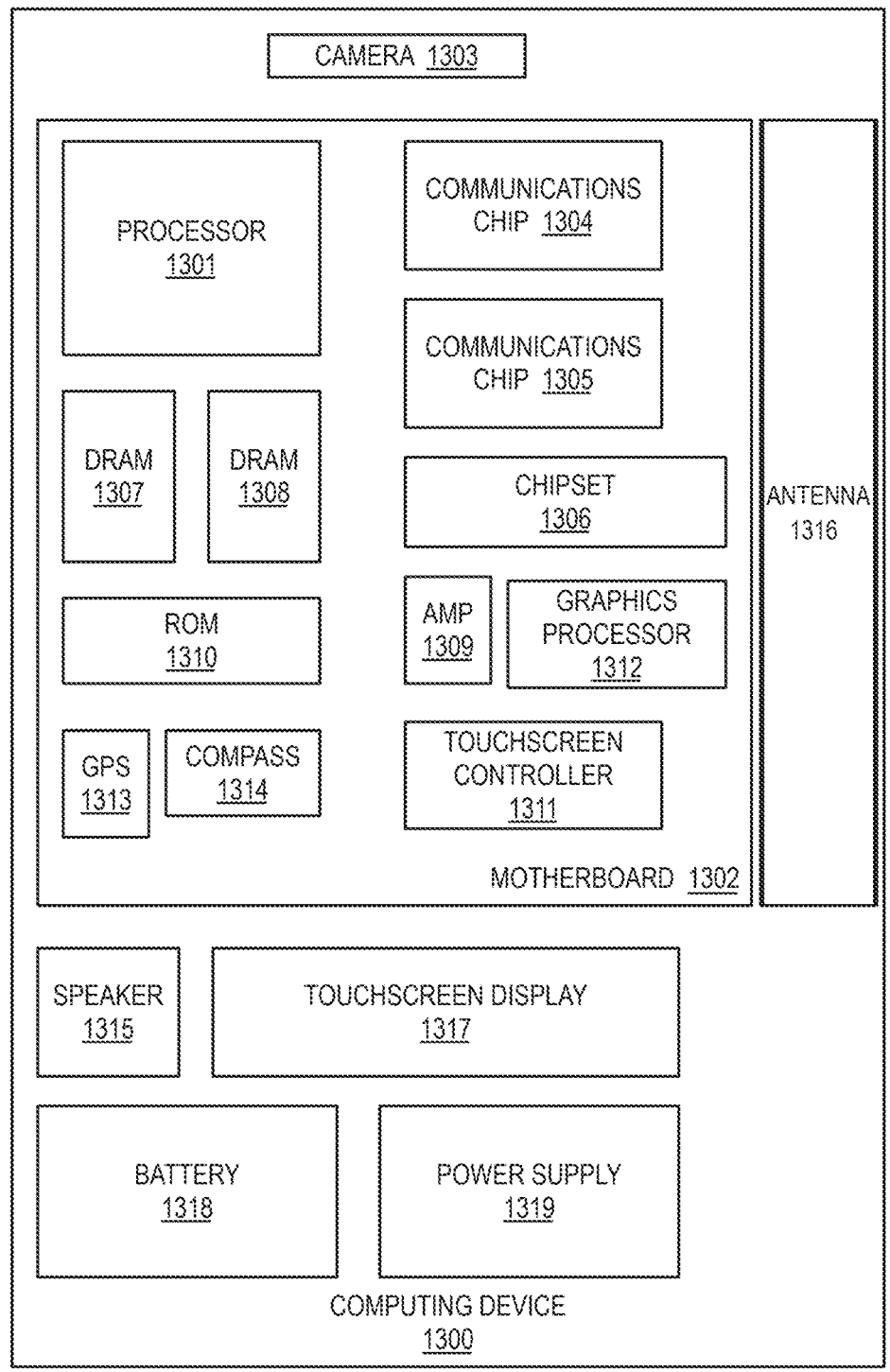
FIG. 13 is a functional block diagram of a computing device, all arranged in accordance with at least some implementations of the present disclosure.

FIG. 13 is a functional block diagram of a computing device 1300, arranged in accordance with at least some implementations of the present disclosure. Computing device 1300 may be found inside platform 1200, for example, and further includes a motherboard 1302 hosting a number of components, such as but not limited to a processor 1301 (e.g., an applications processor) and one or more communications chips 1304, 1305. Processor 1301 may be physically and/or electrically coupled to motherboard 1302. In some examples, processor 1301 includes an integrated circuit die packaged within the processor 1301. In general, the term "processor" may refer to any device or portion of a device that processes electronic data from registers and/or memory to transform that electronic data into other electronic data that may be stored in registers and/or memory. Any one or more device or component of computing device 1300 may include a resistive heating element (e.g., compact integrated thermal element, CITE), or any other structure with any related characteristics discussed herein.

In various examples, one or more communication chips 1304, 1305 may also be physically and/or electrically coupled to the motherboard 1302. In further implementations, communication chips 1304 may be part of processor 1301. Depending on its applications, computing device 1300 may include other components that may or may not be physically and electrically coupled to motherboard 1302. These other components may include, but are not limited to, volatile memory (e.g., DRAM) 1307, 1308, non-volatile memory (e.g., ROM) 1310, a graphics processor 1312, flash memory, global positioning system (GPS) device 1313, compass 1314, a chipset 1306, an antenna 1316, a power amplifier 1309, a touchscreen controller 1311, a touchscreen display 1317, a speaker 1315, a camera 1303, a battery 1318, and a power supply 1319, as illustrated, and other components such as a digital signal processor, a crypto processor, an audio codec, a video codec, an accelerometer, a gyroscope, and a mass storage device (such as hard disk drive, solid state drive (SSD), compact disk (CD), digital versatile disk (DVD), and so forth), or the like.

Communication chips 1304, 1305 may enable wireless communications for the transfer of data to and from the computing device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Communication chips 1304, 1305 may implement any of a number of wireless standards or protocols, including but not limited to those described elsewhere herein. As discussed, computing device 1300 may include a plurality of communication chips 1304, 1305. For example, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others. Furthermore, power supply 1319 may convert a source power from a source voltage to one or more voltages employed by other devices of computing device 1300 (or mobile computing platform 1200). In some embodiments, power supply 1319 converts an AC power to DC power. In some embodiments, power supply 1319 converts an DC power to DC power at one or more different (lower) voltages. In some embodiments, multiple power supplies are staged to convert from AC to DC and then from DC at a higher voltage to DC at a lower voltage as specified by components of computing device 1300.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, an integrated circuit die comprises a substrate, a device region, the device region comprising a plurality of semiconductor devices each comprising a source or drain structure over the substrate, wherein the source or drain structure comprise silicon or germanium and one or more of nickel, cobalt, tungsten, tantalum, titanium, platinum, palladium, or molybdenum, and a resistive heating element over the substrate and within the device region or a second region, wherein the resistive heating element is coplanar with the source or drain structures and comprises silicon or germanium and the one or more of nickel, cobalt, tungsten, tantalum, titanium, platinum, palladium, or molybdenum.

In one or more second embodiments, further to the first embodiments, the resistive heating element is to provide not less than 0.07 mW/mm$^2$ to the integrated circuit die.

In one or more third embodiments, further to the first or second embodiments, the resistive heating element extends substantially around a perimeter of the device region and is absent within the device region.

In one or more fourth embodiments, further to the first through third embodiments, at least a portion of the resistive heating element is in the device region.

In one or more fifth embodiments, further to the first through fourth embodiments, a ratio of a length of the resistive heating element in the device region to a width of the device region is not less than four.

In one or more sixth embodiments, further to the first through fifth embodiments, the integrated circuit die further comprises first and second contacts coupled to the resistive heating element, wherein the resistive heating element extends a distance of not less than 20 mm between the first and second contacts.

In one or more seventh embodiments, further to the first through sixth embodiments, the source or drain structure and the resistive heating element each comprise one or more of nickel silicide, cobalt silicide, tungsten silicide, tantalum silicide, titanium silicide, platinum silicide, palladium silicide, molybdenum silicide, nickel germanide, cobalt germanide, tungsten germanide, tantalum germanide, titanium germanide, platinum germanide, palladium germanide, or molybdenum germanide.

In one or more eighth embodiments, a system comprises a package substrate, an integrated circuit (IC) die coupled to the package substrate, the IC die comprising a device region comprising a plurality of semiconductor devices each comprising a source or drain structure comprising silicon or germanium and one or more of nickel, cobalt, tungsten, tantalum, titanium, platinum, palladium, or molybdenum and a resistive heating element coplanar with the source or drain structures, wherein the resistive heating element comprises silicon or germanium and the one or more of nickel, cobalt, tungsten, tantalum, titanium, platinum, palladium, or molybdenum, and a controller coupled to the package substrate and the resistive heating element, the controller to operate at a temperature below a minimum boot temperature of the IC die, to monitor a temperature corresponding to the IC die, and to activate the resistive heating element based on the monitored temperature.

In one or more ninth embodiments, further to the eighth embodiments, the resistive heating element is to provide not less than 0.07 mW/mm$^2$ to the integrated circuit die In one or more tenth embodiments, further to the eighth or ninth embodiments, the system further comprises a package temperature sensor coupled to the controller.

In one or more eleventh embodiments, further to the eighth through tenth embodiments, the controller is to monitor a package temperature from the package temperature sensor, activate the resistive heating element in response to the package temperature being less than the minimum boot temperature, and to provide a boot up signal in response to the package temperature meeting or exceeding the minimum boot temperature.

In one or more twelfth embodiments, further to the eighth through eleventh embodiments, the controller is further to activate the resistive heating element in response to the on package temperature being less than a minimum operating temperature, and disable the resistive heating element in response to the on-die temperature meeting or exceeding the minimum on-die temperature.

In one or more thirteenth embodiments, further to the eighth through twelfth embodiments, the system further comprises an on-die temperature sensor corresponding to the IC die, the controller or control logic of the IC die to monitor an on-die temperature from the on-die temperature sensor, activate the resistive heating element in response to the on-die temperature being less than a minimum operating temperature of the IC die, and disable the resistive heating element in response to the on-die temperature meeting or exceeding the minimum operating temperature of the IC die.

In one or more fourteenth embodiments, a method comprises determining a temperature corresponding to an environment of an integrated circuit (IC) die is less than a minimum boot up temperature of the IC die, activating, in response to the temperature being less than the minimum boot up temperature and absent a boot up of the IC die, a resistive heating element embedded in the IC die, monitoring, during said activating of the resistive heating element, the temperature corresponding to the environment of the IC die, and booting the IC die in response to the monitored temperature meeting or exceeding the minimum boot up temperature.

In one or more fifteenth embodiments, further to the fourteenth embodiments, the IC die comprises a component of a device package and the temperature corresponding to the environment of the IC die comprises a temperature from a temperature sensor of the device package.

In one or more sixteenth embodiments, further to the fourteenth or fifteenth embodiments, the method further comprises monitoring, after said booting the IC die, an on-die temperature of the IC die, and activating, in response to the temperature being less than a minimum operating temperature of the IC die, the resistive heating element.

In one or more seventeenth embodiments, further to the fourteenth through sixteenth embodiments, the method further comprises disabling the resistive heating element in response to the on-die temperature of the IC die exceeding the minimum boot up temperature and the minimum operating temperature.

In one or more eighteenth embodiments, further to the fourteenth through seventeenth embodiments, the method further comprises monitoring, after said booting the IC die, the temperature corresponding to the environment of the IC die, and activating, in response to the temperature being less than a minimum operating temperature of the IC die, the resistive heating element.

In one or more nineteenth embodiments, further to the fourteenth through eighteenth embodiments, the method further comprises disabling the resistive heating element in response to the temperature of the IC die exceeding the minimum operating temperature.

In one or more twentieth embodiments, further to the fourteenth through nineteenth embodiments, the resistive heating element comprises a silicide or a germanide and the IC die comprises a transistor comprising a source or drain structure coplanar with the resistive heating element and comprising the silicide or the germanide.

It will be recognized that the invention is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. An integrated circuit die, comprising:
    a substrate;
    a device region, the device region comprising a plurality of semiconductor devices each comprising a source structure or a drain structure over the substrate, wherein the source structure or the drain structure comprises silicon or germanium and one or more of nickel, cobalt, tungsten, tantalum, titanium, platinum, palladium, or molybdenum; and
    a resistive heating element over the substrate and within the device region or a second region, wherein the resistive heating element is coplanar with the source structure or the drain structure and comprises silicon or germanium and the one or more of nickel, cobalt, tungsten, tantalum, titanium, platinum, palladium, or molybdenum, and wherein the resistive heating element is to provide not less than 0.07 mW/mm$^2$ to the integrated circuit die.

2. The integrated circuit die of claim 1, wherein the resistive heating element extends substantially around a perimeter of the device region and is absent within the device region.

3. The integrated circuit die of claim 1, wherein at least a portion of the resistive heating element is in the device region.

4. The integrated circuit die of claim 3, wherein a ratio of a length of the resistive heating element in the device region to a width of the device region is not less than four.

5. The integrated circuit die of claim 1, further comprising:
    a first contact and a second contact coupled to the resistive heating element, wherein the resistive heating element extends a distance of not less than 20 mm between the first contact and the second contact.

6. The integrated circuit die of claim 1, wherein the source structure or the drain structure and the resistive heating element each comprise one or more of nickel silicide, tungsten silicide, or titanium silicide.

7. A system, comprising:
    a package substrate;
    an integrated circuit (IC) die coupled to the package substrate, the IC die comprising:
        a device region comprising a plurality of semiconductor devices each comprising a source structure or a drain structure comprising silicon or germanium and one or more of nickel, cobalt, tungsten, tantalum, titanium, platinum, palladium, or molybdenum; and
        a resistive heating element coplanar with the source structure or the drain structure, wherein the resistive heating element comprises silicon or germanium and the one or more of nickel, cobalt, tungsten, tantalum, titanium, platinum, palladium, or molybdenum, wherein the resistive heating element is to provide not less than 0.07 mW/mm$^2$ to the IC die; and
    a controller coupled to the package substrate and the resistive heating element, the controller to operate at a temperature below a minimum boot temperature of the IC die, monitor a temperature corresponding to the IC die, and activate the resistive heating element based on the monitored temperature.

8. The system of claim 7, further comprising a package temperature sensor coupled to the controller.

9. The system of claim 8, wherein the controller is to monitor a package temperature from the package temperature sensor, activate the resistive heating element in response to the package temperature being less than the minimum boot temperature, and provide a boot up signal in response to the package temperature meeting or exceeding the minimum boot temperature.

10. The system of claim 9, wherein the controller is further to activate the resistive heating element in response to the on package temperature being less than a minimum operating temperature, and disable the resistive heating element in response to the on package temperature meeting or exceeding the minimum on-die temperature.

11. The system of claim 8, further comprising an on-die temperature sensor corresponding to the IC die, the controller or control logic of the IC die to monitor an on-die temperature from the on-die temperature sensor, activate the resistive heating element in response to the on-die temperature being less than a minimum operating temperature of the IC die, and disable the resistive heating element in response to the on-die temperature meeting or exceeding the minimum operating temperature of the IC die.

12. An apparatus, comprising:
a device region of an integrated circuit (IC) die, the device region comprising a plurality of semiconductor devices each comprising a source structure or a drain structure, wherein the source structure or the drain structure comprises silicon or germanium and one or more of nickel, cobalt, tungsten, tantalum, titanium, platinum, palladium, or molybdenum; and
a resistive heating element of the IC die, the resistive heating element within the device region or a second region, wherein the resistive heating element is coplanar with the source structure or the drain structure and comprises silicon or germanium and the one or more of nickel, cobalt, tungsten, tantalum, titanium, platinum, palladium, or molybdenum, and wherein the resistive heating element is to provide not less than 0.07 mW/mm$^2$ to the IC die.

13. The apparatus of claim 12, wherein the resistive heating element extends substantially around a perimeter of the device region and is absent within the device region.

14. The apparatus of claim 12, wherein at least a portion of the resistive heating element is in the device region.

15. The apparatus of claim 12, further comprising:
a first contact and a second contact coupled to the resistive heating element, wherein the resistive heating element extends a distance of not less than 20 mm between the first contact and the second contact.

16. The apparatus of claim 12, wherein the source structure or the drain structure and the resistive heating element each comprise one or more of nickel silicide, tungsten silicide, or titanium silicide.

17. The apparatus of claim 12, further comprising:
a package substrate, wherein the IC die is coupled to the package substrate; and
a controller coupled to the package substrate and the resistive heating element.

18. The apparatus of claim 17, wherein the controller is to operate at a temperature below a minimum boot temperature of the IC die, monitor a temperature corresponding to the IC die, and activate the resistive heating element based on the monitored temperature.

* * * * *